United States Patent [19]
Toda

[11] Patent Number: 5,838,088
[45] Date of Patent: Nov. 17, 1998

[54] SURFACE ACOUSTIC WAVE DEVICE FOR SENSING A TOUCH-POSITION

[76] Inventor: Kohji Toda, 1-49-18 Futaba, 239, Yokosuka, Japan

[21] Appl. No.: 812,707

[22] Filed: Mar. 6, 1997

[51] Int. Cl.$^6$ .................................................. H01L 41/04
[52] U.S. Cl. ................................ 310/313 R; 310/313 B; 310/313 D; 333/193; 73/24.04
[58] Field of Search ........................... 310/313 R, 313 B, 310/313 D; 333/193; 73/24.04

*Primary Examiner*—Clayton LaBalle
*Assistant Examiner*—Timothy A. Williams

[57] ABSTRACT

A surface acoustic wave position-sensing device comprising two surface acoustic wave transducing units, a nonpiezoelectric plate and a controlling system connected with the units. Each unit consists of two piezoelectric substrates, a first group of interdigital transducers (IDTs) and a second group of interdigital transducers (IDTs). The second group of the IDTs is placed such that the finger direction thereof is slanting to that of the first group of the IDTs by an angle $\alpha$. The thickness of each piezoelectric substrate is smaller than an interdigital periodicity of the IDTs. The thickness of the nonpiezoelectric plate is larger than three times the interdigital periodicity. When an electric signal is applied to the first group of the IDTs, a SAW is excited in one of the piezoelectric substrates and transmitted to the other of the piezoelectric substrates through the upper end surface of the nonpiezoelectric plate. The controlling system senses a touch with a finger on the upper end surface of the nonpiezoelectric plate by the generation of the electric signal at one of the second group IDTs.

19 Claims, 14 Drawing Sheets

SURFACE ACOUSTIC WAVE DEVICE FOR SENSING A TOUCH-POSITION

BACKGROUND OF THE INVENTION

1. Field of the Invention

The present invention relates to a surface acoustic wave device for sensing a touch-position on a nonpiezoelectric plate having two surface acoustic wave transducing units.

2. Description of the Prior Art

An ultrasonic form of conventional touch panels has a nonpiezoelectric plate under acoustic vibration, which is decreased or disappeared when touching on the nonpiezoelectric plate. Conventional methods for exciting the acoustic vibration on a nonpiezoelectric plate generally include a wedge-shaped transducer with a bulk wave vibrator for vibrating a nonpiezoelectric plate indirectly, or a piezoelectric thin film transducer for vibrating a nonpiezoelectric plate directly. The wedge-shaped transducer is mainly used for a non-destructive evaluation by ultrasound under a comparative low frequency operation alone because of the difficulty on manufacturing accuracy of the wedge angle and so on. The piezoelectric thin film transducer consists of a nonpiezoelectric plate, a piezoelectric thin film mounted on the nonpiezoelectric plate and made from ZnO and others, and interdigital transducers exciting the acoustic vibration on the nonpiezoelectric plate. Because of various transmission characteristics of the interdigital transducers with various structures, the piezoelectric thin film transducer is used as a high frequency device, however has operation frequencies limited to the UHF and VHF bands, and has some problems on manufacturing and mass production. In addition, conventional-type transducers make use of decreasing or disappearance of output electric signal in accordance with decreasing or disappearance of an acoustic wave on the nonpiezoelectric plate by touching thereon, causing a high voltage operation with a high power consumption, and a large-scale circuit with a complicated structure.

Thus, it is difficult for conventional touch panels to realize a quick response-time, a low voltage operation and a low power consumption, an accurate detection of a minute touch-position, and a small-sized circuit with a simple structure. Moreover, there are some problems on manufacturing, mass production and operation frequencies.

SUMMARY OF THE INVENTION

An object of the present invention is to provide a surface acoustic wave position-sensing device capable of specifying a minute touch-position on a nonpiezoelectric substrate with a high sensitivity and a quick response time.

Another object of the present invention is to provide a surface acoustic wave position-sensing device excellent in manufacturing and mass-production.

A still other object of the present invention is to provide a surface acoustic wave position-sensing device operating under low power consumption with low voltage.

A still further object of the present invention is to provide a surface acoustic wave position-sensing device having a small-sized circuit with a simple structure which is very light in weight.

According to one aspect of the present invention there is provided a surface acoustic wave position-sensing device comprising two surface acoustic wave transducing units X and Y, a nonpiezoelectric plate having an upper- and a lower end surfaces running perpendicular to the thickness direction thereof, and a controlling system connected with the surface acoustic wave transducing units X and Y. Each surface acoustic wave transducing unit consists of a piezoelectric substrate $P_T$ having two end surfaces running perpendicular to the direction of the thickness d thereof, a piezoelectric substrate $P_R$ having two end surfaces running perpendicular to the direction of the thickness d thereof, an input interdigital transducer $T_o$ formed on one end surface of the piezoelectric substrate $P_T$, N input interdigital transducers $T_i$ (i=1, 2, . . . , N) formed on the one end surface of the piezoelectric substrate $P_T$, an output interdigital transducer $R_o$ opposed to the interdigital transducer $T_o$ and formed on one end surface of the piezoelectric substrate $P_R$, and at least two output interdigital transducers $R_{i1}$ and $R_{i2}$ (i=1, 2, . . . , N) opposed to each interdigital transducer $T_i$ and formed on the one end surface of the piezoelectric substrate $P_R$. The interdigital transducer $R_o$ is placed such that the finger direction of the interdigital transducer $R_o$ runs parallel with that of the interdigital transducer $T_o$. The thickness d of the piezoelectric substrates $P_T$ and $P_R$ is smaller than an interdigital periodicity P of the interdigital transducers $T_o$, $T_i$ and $R_o$. The thickness of the nonpiezoelectric plate is larger than three times the interdigital periodicity P. Each of the interdigital transducers $R_{i1}$ and $R_{i2}$ is placed such that the finger direction thereof is slanting to that of the interdigital transducer $T_i$ by an angle $\alpha$. An interdigital periodicity $P_N$ along the vertical direction to the finger direction of the interdigital transducers $R_{i1}$ and $R_{i2}$ is equal to the product of the interdigital periodicity P and cos $\alpha$. The sum of an overlap length $L_P$ along the finger direction of the interdigital transducer $R_{i1}$ and that of the interdigital transducer $R_{i2}$ is approximately equal to the product of an overlap length L of the interdigital transducer $T_i$ and sec $\alpha$. The piezoelectric substrates $P_T$ and $P_R$ are mounted on the upper end surface of the nonpiezoelectric plate.

When an electric signal with a frequency approximately corresponding to the interdigital periodicity P is applied to each of the interdigital transducers $T_o$ and $T_i$, a surface acoustic wave of the first mode and the higher order modes is excited in the piezoelectric substrate $P_T$ and transmitted to the piezoelectric substrate $P_R$ through the upper end surface of the nonpiezoelectric plate. The phase velocity of the surface acoustic wave of the first mode and the higher order modes is approximately equal to the phase velocity of the Rayleigh wave traveling on the nonpiezoelectric plate alone. The surface acoustic wave excited by the interdigital transducer $T_o$ is transduced to an electric signal with a phase $\theta_{base}$, and delivered at the interdigital transducer $R_o$. The surface acoustic wave excited by each interdigital transducer $T_i$ is transduced to electric signals $E_j$ (j=1, 2, . . . , X) with phases $\theta_j$ (j=1, 2, . . . , X), by each of the interdigital transducers $R_{i1}$ and $R_{i2}$, the phases $\theta_j$ corresponding to positions $F_j$ (j=1, 2, . . . , X) on the upper end surface of the nonpiezoelectric plate, each electric signal $E_j$ having a frequency approximately corresponding to the interdigital periodicity P. The total phase $\Sigma\theta_j$ made by the phases $\theta_j$ is zero, and the total electric signal $\Sigma E_j$ made by the electric signals $E_j$ is also zero and not able to be detected at each of the interdigital transducers $R_{i1}$ and $R_{i2}$. The nonpiezoelectric plate is made of a material such that the phase velocity of the surface acoustic wave traveling on the nonpiezoelectric plate alone is higher than that traveling on the piezoelectric substrates $P_T$ and $P_R$ alone. The interdigital transducers $T_i$ and $R_{i1}$ form N propagation lanes $D_{i1}$ (i=1, 2, . . . , N) of the surface acoustic wave on the upper end surface of the nonpiezoelectric plate. The interdigital transducers $T_i$ and $R_{i2}$ form N propagation lanes $D_{i2}$ (i=1, 2, . . . , N) of the surface acoustic wave on the upper end surface of the nonpiezoelectric plate. Two neighbors of the propagation lanes $D_{i1}$ and $D_{i2}$ are closed or partially overlapping each other. The propagation lanes $D_{i1}$ and $D_{i2}$ of the surface acoustic wave transducing unit X and that of the surface acoustic wave transducing unit Y are vertical to each other. Each propagation lane consists of minute propagation lanes $Z_j$ (j=1, 2, ..., X) corresponding to the positions $F_j$. If touching a position $F_x$ on a minute propagation lane $Z_x$ out of the propagation lanes $D_{i1}$ and $D_{i2}$, an electric signal E with a phase θ is delivered from one of the interdigital transducers $R_{i1}$ and $R_{i2}$, the position $F_x$ corresponding to an electric signal $E_x$ with a phase $\theta_x$, the total electric signal $\Sigma E_j$ minus the electric signal $E_x$ being equal to the electric signal E, the total phase $\Sigma \theta_j$ minus the phase $\theta_x$ being equal to the phase θ. The controlling system senses a touch with a finger or others on the position $F_x$ by an appearance of the electric signal E at the one of the interdigital transducers $R_{i1}$ and $R_{i2}$, and finds the position $F_x$ by detecting the one, delivering the electric signal E, of the interdigital transducers $R_{i1}$ and $R_{i2}$, and by evaluating a difference between the phases θ and $\theta_{base}$.

According to another aspect of the present invention there are provided N switches $W_i$ (i=1, 2, ..., N) corresponding to the interdigital transducers $T_i$, an output terminal of each switch $W_i$ being connected with an input terminal of each interdigital transducer $T_i$. Output terminals of the interdigital transducers $R_{i1}$ are connected with each other at an output point $Q_1$. Output terminals of the interdigital transducers $R_{i2}$ are connected with each other at an output point $Q_2$. The controlling system turns on and off the switches $W_i$ with a fixed period in turn, senses a touch on the position $F_x$ by an appearance of the electric signal E at one of the output points $Q_1$ and $Q_2$, and finds the position $F_x$ by detecting the one, delivering the electric signal E, of the output points $Q_1$ and $Q_2$, by choosing a closed one out of the switches $W_i$ when the electric signal E appears, and by evaluating the difference between the phases θ and $\theta_{base}$.

According to another aspect of the present invention there is provided an amplifier $A_x$, an input terminal of the interdigital transducer $R_o$ of the surface acoustic wave transducing unit X being connected with each input terminal of the interdigital transducer $T_o$ of the surface acoustic wave transducing units X and Y via the amplifier $A_x$. The interdigital transducers $T_o$ and $R_o$ in the surface acoustic wave transducing unit X, a propagation lane of a surface acoustic wave between the interdigital transducers $T_o$ and $R_o$ in the surface acoustic wave transducing unit X, and the amplifier $A_x$ form an oscillator.

According to another aspect of the present invention there is provided a surface acoustic wave position-sensing device comprising two surface acoustic wave transducing units X and Y, the nonpiezoelectric plate, and the controlling system connected with the surface acoustic wave transducing units X and Y. Each surface acoustic wave transducing unit consists of the piezoelectric substrates $P_T$ and $P_R$, the interdigital transducers $T_o$, $R_o$, $R_{i1}$ and $R_{i2}$, N input interdigital transducers $M_i$ (i=1, 2, ..., N) in place of the interdigital transducers $T_i$ formed on the upper end surface of the piezoelectric substrate $P_T$, N earth electrodes $G_i$ (i=1, 2, ..., N) formed on the lower end surface of the piezoelectric substrate $P_T$ and corresponding with the interdigital transducers $M_i$, respectively, and a phase shifter S including at least a coil $L_1$. Each interdigital transducer $M_i$ having the same interdigital periodicity as the interdigital periodicity P, consists of two electrodes $M_{i-1}$ and $M_{i-2}$ and has two kinds of distances between one electrode finger of the electrode $M_{i-1}$ and two neighboring electrode fingers of the electrode $M_{i-2}$. Each of the interdigital transducers $R_{i1}$ and $R_{i2}$ is placed such that the finger direction thereof is slanting to that of the interdigital transducer $M_i$ by an angle α, respectively.

When electric signals $V_1$ and $V_2$, with a frequency approximately corresponding to the interdigital periodicity P, are applied between the electrode $M_{i-1}$ and the earth electrode $G_i$, and between the electrode $M_{i-2}$ and the earth electrode $G_i$ via the phase shifter S, respectively, an unidirectional surface acoustic wave of the first mode and the higher order modes is excited in the piezoelectric substrate $P_T$, on condition that x<½ in a shorter distance xP of the two kinds of distances between one electrode finger of the electrode $M_{i-1}$ and two neighboring electrode fingers of the electrode $M_{i-2}$, and x+y=±½ in a phase difference 2πy between the electric signals $V_1$ and $V_2$. The unidirectional surface acoustic wave is transmitted to the piezoelectric substrate $P_R$ through the upper end surface of the nonpiezoelectric plate. The unidirectional surface acoustic wave excited by each interdigital transducer $M_i$ and each earth electrode $G_i$ is transduced to electric signals $E_j$ with phases $\theta_j$, respectively, the phases $\theta_j$ corresponding to the positions $F_j$. The interdigital transducers $M_i$ and $R_{i1}$ form N propagation lanes $D_{i1}$ of the surface acoustic wave on the upper end surface of the nonpiezoelectric plate. The interdigital transducers $M_i$ and $R_{i2}$ form N propagation lanes $D_{i2}$ of the surface acoustic wave on the upper end surface of the nonpiezoelectric plate. Each propagation lanes $D_{i1}$ and $D_{i2}$ consists of minute propagation lanes $Z_j$ corresponding to the positions $F_j$. If touching a position $F_x$ on a minute propagation lane $Z_x$, an electric signal E with a phase θ is delivered from one of the interdigital transducers $R_{i1}$ and $R_{i2}$. The controlling system senses a touch with a finger or others on the position $F_x$ by an appearance of the electric signal E at the one of the interdigital transducers $R_{i1}$ and $R_{i2}$, and finds the position $F_x$ by detecting the one, delivering the electric signal E, of the interdigital transducers $R_{i1}$ and $R_{i2}$, and by evaluating a difference between the phases θ and $\theta_{base}$.

According to another aspect of the present invention there are provided piezoelectric substrates $P_T$ and $P_R$ made of a piezoelectric ceramic, the polarization axis thereof being parallel to the thickness direction thereof.

According to other aspect of the present invention there are provided piezoelectric substrates $P_T$ and $P_R$ made of a piezoelectric polymer such as PVDF and so on.

According to a further aspect of the present invention there is provided a supporting board cemented to the lower end surface of the nonpiezoelectric plate.

BRIEF DESCRIPTION OF THE DRAWINGS

Other features and advantages of the invention will be clarified from the following description with reference to the attached drawings.

DETAILED DESCRIPTION OF THE PRESENTLY PREFERRED EXEMPLARY EMBODIMENTS

Figure 1:
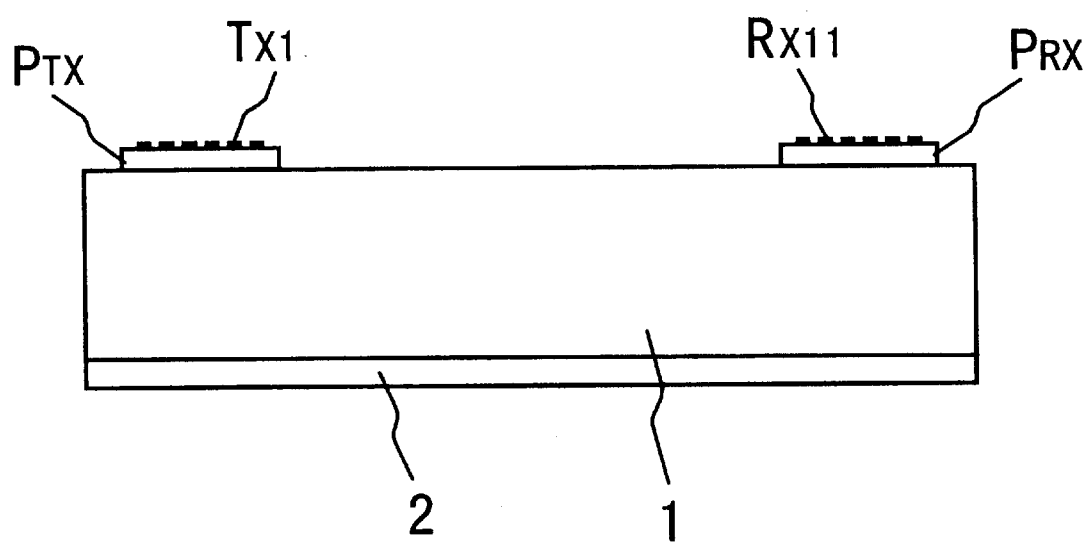
FIG. 1 shows a sectional view of a surface acoustic wave position-sensing device according to a first embodiment of the present invention.

FIG. 1 shows a sectional view of a surface acoustic wave position-sensing device according to a first embodiment of the present invention. The surface acoustic wave position-sensing device comprises nonpiezoelectric plate (1) having an upper- and a lower end surfaces running perpendicular to the thickness direction thereof, supporting board (2), controlling system (3), switches ($W_1$ and $W_2$), amplifier ($A_x$) and surface acoustic wave transducing units (X and Y). Surface acoustic wave transducing unit (X) comprises piezoelectric substrate ($P_{TX}$) having an upper- and a lower end surfaces running perpendicular to the direction of the thickness d thereof, piezoelectric substrate ($P_{RX}$) having an upper- and a lower end surfaces running perpendicular to the direction of the thickness d thereof, input interdigital transducers ($T_{X0}$, $T_{X1}$ and $T_{X2}$), and output interdigital transducers ($R_{X0}$, $R_{X11}$, $R_{X12}$, $R_{X13}$, $R_{X14}$, $R_{X21}$, $R_{X22}$, $R_{X23}$ and $R_{X24}$). Surface acoustic wave transducing unit (Y) comprises piezoelectric substrate ($P_{TY}$) having an upper- and a lower end surfaces running perpendicular to the direction of the thickness d thereof, piezoelectric substrate ($P_{RY}$) having an upper- and a lower end surfaces running perpendicular to the direction of the thickness d thereof, input interdigital transducers ($T_{Y0}$, $T_{Y1}$ and $T_{Y2}$) and output interdigital transducers ($R_{Y0}$, $R_{Y11}$, $R_{Y12}$, $R_{Y13}$, $RY_{14}$, $R_{Y21}$, $R_{Y22}$, $R_{Y23}$ and $R_{Y24}$). FIG. 1 shows only nonpiezoelectric plate (1), supporting board (2), piezoelectric substrates ($P_{TX}$ and $P_{RX}$), and interdigital transducers ($T_{X1}$ and $R_{X11}$). Each piezoelectric substrate, of which material is piezoelectric ceramic and having a dimension of 150 μm in thickness, is cemented on the upper end surface of nonpiezoelectric plate (1), of which material is glass and having a dimension of 1.5 mm in thickness, through an epoxy resin with thickness of about 20 μm. The lower end surface of nonpiezoelectric plate (1) is cemented on supporting board (2).

Figure 2:
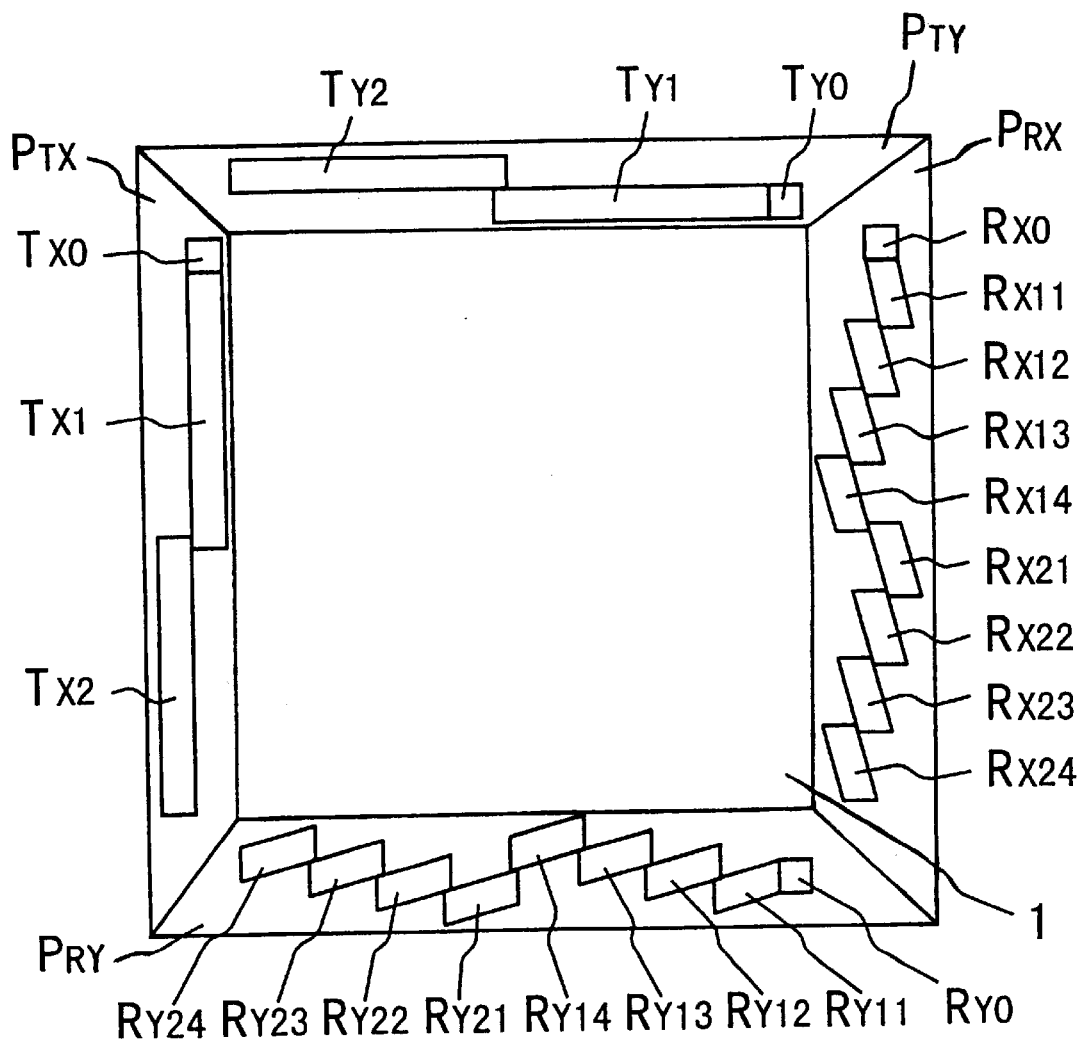
FIG. 2 shows a plan view of the surface acoustic wave position-sensing device in FIG. 1.

FIG. 2 shows a plan view of the surface acoustic wave position-sensing device in FIG. 1. FIG. 2 shows only nonpiezoelectric plate (1), the piezoelectric substrates, and the interdigital transducers made from aluminium thin film. Interdigital transducers ($T_{X0}$, $T_{X1}$ and $T_{X2}$) are mounted on the upper end surface of piezoelectric substrate ($P_{TX}$). Interdigital transducers ($R_{X0}$, $R_{X11}$, $R_{X12}$, $R_{X13}$, $R_{X14}$, $R_{X21}$, $R_{X22}$, $R_{X23}$ and $R_{X24}$) are mounted on the upper end surface of piezoelectric substrate ($P_{RX}$). Interdigital transducers ($T_{Y0}$, $T_{Y1}$ and $T_{Y2}$) are mounted on the upper end surface of piezoelectric substrate ($P_{TY}$). Interdigital transducers ($R_{Y0}$, $R_{Y11}$, $R_{Y12}$, $R_{Y13}$, $R_{Y14}$, $R_{Y21}$, $R_{Y22}$, $R_{Y23}$ and $R_{Y24}$) are mounted on the upper end surface of piezoelectric substrate ($P_{RY}$). Two neighboring piezoelectric substrates, for example, piezoelectric substrates ($P_{TX}$ and $P_{TY}$), can be linked to each other. Thus, it is possible to use only one body formed by piezoelectric substrates ($P_{TX}$, $P_{TY}$, $P_{RX}$ and $P_{RY}$). In addition, the interdigital transducers can be mounted on the lower end surface of piezoelectric substrates ($P_{TX}$, $P_{RX}$, $P_{TY}$ and $P_{RY}$), that is between nonpiezoelectric plate (1) and piezoelectric substrates ($P_{TX}$, $P_{RX}$, $P_{TY}$ and $P_{RY}$). Interdigital transducers ($T_{X0}$, $R_{X0}$, $T_{Y0}$ and $R_{Y0}$) have the same common-type constructions with an overlap length shorter than that of interdigital transducers ($T_{X1}$, $T_{X2}$, $T_{Y1}$ and $T_{Y2}$) having the same common-type constructions. Interdigital transducers ($R_{X11}$, $R_{X12}$, $R_{X13}$, $R_{X14}$, $R_{X21}$, $R_{X22}$, $R_{X23}$, $R_{X24}$, $R_{Y11}$, $R_{Y12}$, $R_{Y13}$, $R_{Y14}$, $R_{Y21}$, $R_{Y22}$, $R_{Y23}$ and $R_{Y24}$) have the same constructions. The finger direction of interdigital transducers ($R_{X11}$, $R_{X12}$, $R_{X13}$, $R_{X14}$, $R_{X21}$, $R_{X22}$, $R_{X23}$ and $R_{X24}$) is not parallel to that of interdigital transducers ($T_{X1}$ and $T_{X2}$). The finger direction of interdigital transducers ($R_{Y11}$, $R_{Y12}$, $R_{Y13}$, $R_{Y14}$, $R_{Y21}$, $R_{Y22}$, $R_{Y23}$ and $R_{Y24}$) is not parallel to that of interdigital transducers ($T_{Y1}$ and $T_{Y2}$).

Figure 3:
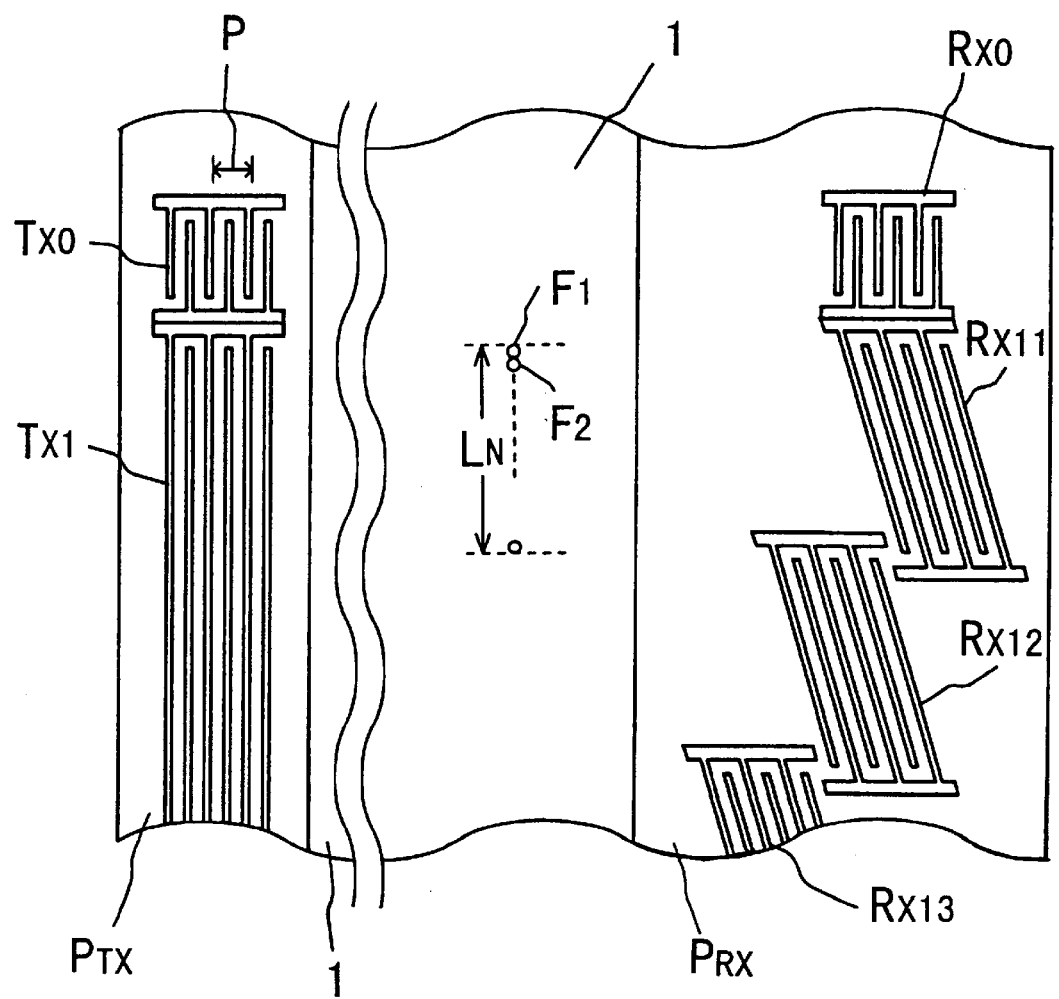
FIG. 3 shows a fragmentary plan view, on an enlarged scale, of the surface acoustic wave position-sensing device in FIG. 1.

FIG. 3 shows a fragmentary plan view, on an enlarged scale, of the surface acoustic wave position-sensing device in FIG. 1. FIG. 3 shows only nonpiezoelectric plate (1), the piezoelectric substrates, and the interdigital transducers consisting of ten finger pairs, respectively. Each of interdigital transducers ($T_{X0}$, $R_{X0}$, $T_{Y0}$ and $R_{Y0}$) has an interdigital periodicity P of 400 μm and an overlap length of 1 mm. Each of interdigital transducers ($T_{X1}$, $T_{X2}$, $T_{Y1}$ and $T_{Y2}$) has an interdigital periodicity P of 400 μm and an overlap length L of 12 mm. The sum of each overlap length $L_N$, along the finger direction of interdigital transducer ($T_{X1}$), of interdigital transducers ($R_{X11}$, $R_{X12}$, $R_{X13}$ and $R_{X14}$) is equal to the overlap length L. The sum of each overlap length $L_N$, along the finger direction of interdigital transducer ($T_{X2}$), of interdigital transducers ($R_{X21}$, $R_{X22}$, $R_{X23}$ and $R_{X24}$) is equal to the overlap length L. The sum of each overlap length $L_N$, along the finger direction of interdigital transducer ($T_{Y1}$), of interdigital transducers ($R_{Y11}$, $R_{Y12}$, $R_{Y13}$ and $R_{Y14}$) is equal to the overlap length L. The sum of each overlap length $L_N$, along the finger direction of interdigital transducer ($T_{Y2}$), of interdigital transducers ($R_{Y21}$, $R_{Y22}$, $R_{Y23}$ and $R_{Y24}$) is equal to the overlap length L. In the surface acoustic wave position-sensing device, it is possible to sense a touch with a finger or others on one of positions $F_j$ (j=1, 2, ..., X), along the finger direction of interdigital transducer ($T_{X1}$ or $T_{X2}$), within each overlap length $L_N$ of interdigital transducers ($R_{X11}$, $R_{X12}$, $R_{X13}$, $R_{X14}$, $R_{X21}$, $R_{X22}$, $R_{X23}$ and $R_{X24}$) on the upper end surface of non piezoelectric plate (1). In the same way, it is possible to sense a touch with a finger or others on one of positions $F_x$ (j=1, 2, ..., X), along the finger direction of interdigital transducer ($T_{Y1}$ or $T_{Y2}$), within each overlap length $L_N$ of interdigital transducers ($R_{Y11}$, $R_{Y12}$, $R_{Y13}$, $R_{Y14}$, $R_{Y21}$, $R_{Y22}$, $R_{Y23}$ and $R_{Y24}$) on the upper end surface of non piezoelectric plate (1).

Figure 4:
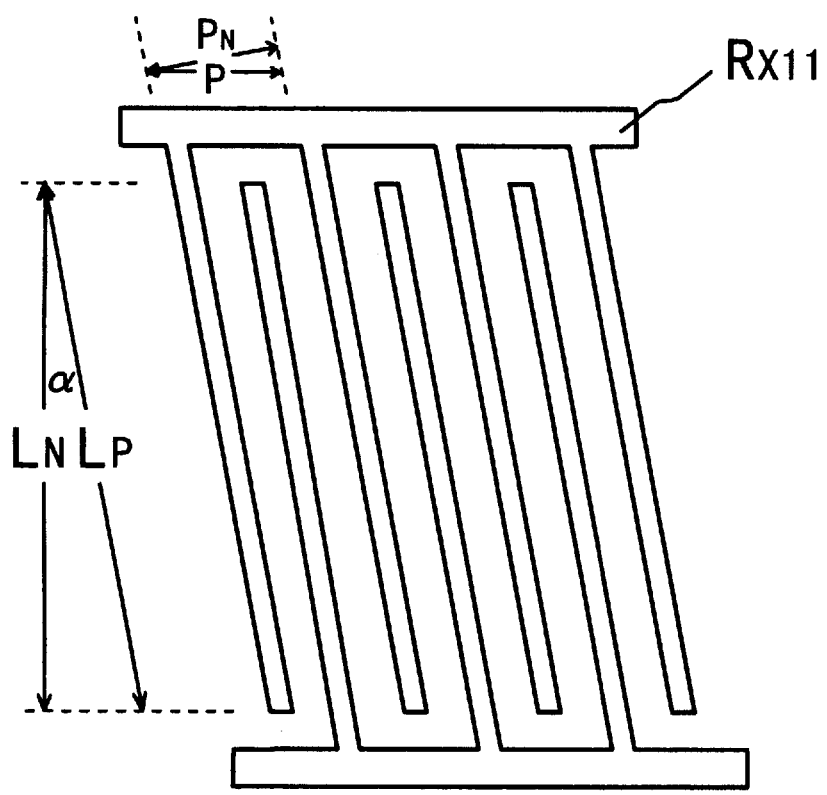
FIG. 4 shows a plan view of interdigital transducer ($R_{X11}$).

FIG. 4 shows a plan view of interdigital transducer ($R_{x11}$). Each of interdigital transducers ($R_{X11}$, $R_{X12}$, $R_{X13}$, $R_{X14}$, $R_{X21}$, $R_{X22}$, $R_{X23}$ and $R_{X24}$) is located such that the finger direction thereof is slanting to that of interdigital transducer ($T_{X1}$ or $T_{X2}$) by an angle $\alpha$. In the same way, each of interdigital transducers ($R_{Y11}$, $R_{Y12}$, $R_{Y13}$, $R_{Y14}$, $R_{Y21}$, $R_{Y22}$, $R_{Y23}$ and $R_{Y24}$) is located such that the finger direction thereof is slanting to that of interdigital transducer ($T_{Y1}$ or $T_{Y2}$) by an angle $\alpha$. An interdigital periodicity $P_N$, along the vertical direction to the finger direction of interdigital transducers ($R_{X11}$, $R_{X12}$, $R_{X13}$, $R_{X14}$, $R_{X21}$, $R_{X22}$, $R_{X23}$ and $R_{X24}$) is equal to the product of the interdigital periodicity P and cos $\alpha$. In the same way, an interdigital periodicity $P_N$, along the vertical direction to the finger direction of interdigital transducers ($R_{Y11}$, $R_{Y12}$, $R_{Y13}$, $R_{Y14}$, $R_{Y21}$, $R_{Y22}$, $R_{Y23}$ and $R_{Y24}$) is equal to the product of the interdigital periodicity P and cos $\alpha$. Each overlap length $L_P$, along the finger direction of interdigital transducers ($R_{X11}$, $R_{X12}$, $R_{X13}$ and $R_{X14}$), of interdigital transducers ($R_{X11}$, $R_{X12}$, $R_{X13}$ and $R_{X14}$) is equal to the product of the overlap length $L_N$ and sec $\alpha$. In other words, the sum of each overlap length $L_P$ of interdigital transducers ($R_{X11}$, $R_{X12}$, $R_{X13}$ and $R_{X14}$) is equal to the product of the overlap length L and sec $\alpha$. In the same way, the sum of each overlap length $L_P$ of interdigital transducers ($R_{X21}$, $R_{X22}$, $R_{X23}$ and $R_{X24}$) is equal to the product of the overlap length L and sec $\alpha$. The sum of each overlap length $L_P$ of interdigital transducers ($R_{Y11}$, $R_{Y12}$, $R_{Y13}$ and $R_{Y14}$) is equal to the product of the overlap length L and sec $\alpha$. The sum of each overlap length $L_P$ of interdigital transducers ($R_{Y21}$, $R_{Y22}$, $R_{Y23}$ and $R_{Y24}$) is equal to the product of the overlap length L and sec $\alpha$.

Figure 5:
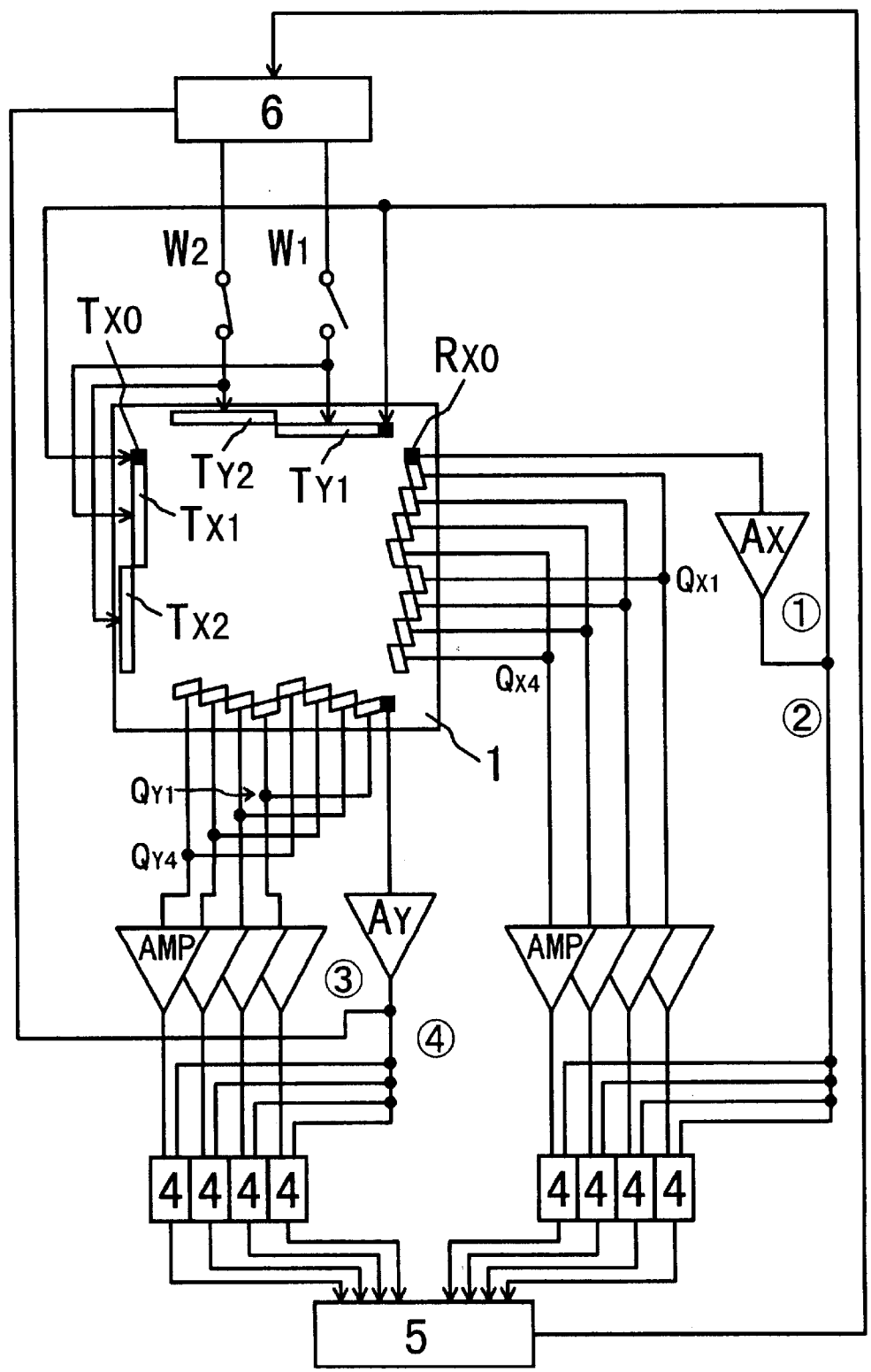
FIG. 5 shows a diagram of a driving circuit of the surface acoustic wave position-sensing device in FIG. 1.

FIG. 5 shows a diagram of a driving circuit of the surface acoustic wave position-sensing device in FIG. 1. Controlling system (3) comprises eight phase comparators (4), computer (5) and switch-change unit (6). Output terminal of switch ($W_1$) is connected with input terminals of interdigital transducers ($T_{X1}$ and $T_{Y1}$). Output terminal of switch ($W_2$) is connected with input terminals of interdigital transducers ($T_{X2}$ and $T_{Y2}$). A point $Q_{X1}$ joining output terminals of interdigital transducers ($R_{X11}$ and $R_{X21}$), a point $Q_{X2}$ joining output terminals of interdigital transducers ($R_{X12}$ and $R_{X22}$), a point $Q_{X3}$ joining output terminals of interdigital transducers ($R_{X13}$ and $R_{X23}$), and a point $Q_{X4}$ joining output terminals of interdigital transducers ($R_{X14}$ and $R_{X24}$) are connected with phase comparators (4) via amplifiers (AMP), respectively. In the same way, a point $Q_{Y1}$ joining output terminals of interdigital transducers ($R_{Y11}$ and $R_{Y21}$), a point $Q_{Y2}$ joining output terminals of interdigital transducers ($R_{Y12}$ and $R_{Y22}$), a point $Q_{Y3}$ joining output terminals of interdigital transducers ($R_{Y13}$ and $R_{Y23}$), and a point $Q_{Y4}$ joining output terminals of interdigital transducers ($R_{Y14}$ and $R_{Y24}$) are connected with phase comparators (4) via amplifiers (AMP), respectively.

In the driving circuit in FIG. 5, when an electric signal having a frequency approximately corresponding to the interdigital periodicity P is applied to interdigital transducers ($T_{X0}$, $T_{X1}$ and $T_{X2}$), respectively, the surface acoustic wave, of the first mode and the higher order modes, having the wavelength approximately equal to the interdigital periodicity P is excited in piezoelectric substrate ($P_{TX}$) effectively. In this time, if the phase velocity of the surface acoustic wave of the first mode and the higher order modes is approximately equal to the phase velocity of the Rayleigh wave traveling on nonpiezoelectric plate (1) alone, the transducing efficiency from the electric signal to the surface acoustic wave increases, and in addition, the reflection caused by the miss-matching on the acoustic impedance at the boundary surface between piezoelectric substrate ($P_{TX}$) and nonpiezoelectric plate (1) never causes. In addition, as piezoelectric substrate ($P_{TX}$) is made from a piezoelectric ceramic having the polarization axis parallel to the thickness direction thereof, the surface acoustic wave of the first mode and the higher order modes is excited in piezoelectric substrate ($P_{TX}$) effectively, and the transducing efficiency from the electric signal to the surface acoustic wave increases. If using a piezoelectric polymer such as PVDF and so on, as piezoelectric substrate ($P_{TX}$), the surface acoustic wave of the first mode and the higher order modes is excited in piezoelectric substrate ($P_{TX}$) effectively, and the transducing efficiency from the electric signal to the surface acoustic wave increases.

The surface acoustic wave excited in piezoelectric substrate ($P_{TX}$) is transmitted to the upper end surface of nonpiezoelectric plate (1). As the the thickness d of piezoelectric substrate ($P_{TX}$) is smaller than the interdigital periodicity P, and the thickness of nonpiezoelectric plate (1) is larger than three times the interdigital periodicity P, it is possible to increase the transmitting efficiency of the surface acoustic wave from piezoelectric substrate ($P_{TX}$) to the upper end surface of nonpiezoelectric plate (1), without a leakage of the surface acoustic wave on the inside of nonpiezoelectric plate (1). In addition, if using a material, as nonpiezoelectric plate (1), such that the phase velocity of the surface acoustic wave traveling on nonpiezoelectric plate (1) alone is higher than that traveling on piezoelectric substrate ($P_{TX}$) alone, it is possible to increase the transmitting efficiency of the surface acoustic wave from piezoelectric substrate ($P_{TX}$) to the upper end surface of nonpiezoelectric plate (1) without a leakage of the surface acoustic wave on the inside of nonpiezoelectric plate (1). Thus, it is possible to operate the surface acoustic wave position-sensing device under low power consumption and low voltage, and moreover, it is possible to support the lower end surface of nonpiezoelectric plate (1) by supporting board (2) directly The surface acoustic wave excited by interdigital transducer ($T_{X0}$) is transmitted to piezoelectric substrate ($P_{RX}$) through the upper end surface of nonpiezoelectric plate (1), and is transduced to an electric signal with a phase $\theta_{base}$ by interdigital transducer ($R_{X0}$), the electric signal being delivered from interdigital transducer ($R_{X0}$) and amplified by amplifier ($A_x$). An electric signal ① is applied to interdigital transducers ($T_{X0}$ and $T_{Y0}$). Thus, interdigital transducers ($T_{X0}$ and $R_{X0}$), a propagation lane, as a delay element, of the surface acoustic wave between interdigital transducers ($T_{X0}$ and $R_{X0}$), and amplifier ($A_x$) form an oscillator, causing not only a low voltage operation and low power consumption, but also a small-sized circuit with a simple structure. An electric signal ② is applied to four phase comparators (4).

The surface acoustic wave excited by interdigital transducer ($T_{X1}$) is transmitted to piezoelectric substrate ($P_{RX}$) through the upper end surface of nonpiezoelectric plate (1), and is transduced to electric signals $E_j$ (j=1, 2, . . . , X) with phases $\theta_j$ (j=1, 2, . . . , X) by each of interdigital transducers ($R_{X11}$, $R_{X12}$, $R_{X13}$ and $R_{X14}$), the phases $\theta_j$ corresponding to the positions $F_j$, respectively. The surface acoustic wave excited by interdigital transducer ($T_{X2}$) is transmitted to piezoelectric substrate ($P_{RX}$) through the upper end surface of nonpiezoelectric plate (1), and is transduced to electric signals $E_j$ (j=1, 2, . . . , X) with phases $\theta_j$ (j=1, 2, . . . , X) by each of interdigital transducers ($R_{X21}$, $R_{X22}$, $R_{X23}$ and $R_{X24}$), the phases $\theta_j$ corresponding to the positions $F_j$, respectively. Each electric signal $E_j$ has a frequency approximately corresponding to the interdigital periodicity P. The total phase $\Sigma \theta_j$ made by phases $\theta_j$ is zero. The total electric signal $\Sigma E_j$ made by electric signals $E_j$ is also zero and is not able to be detected at each of interdigital transducers ($R_{X11}$, $R_{X12}$, $R_{X13}$, $R_{X14}$, $R_{X21}$, $R_{X22}$, $R_{X23}$ and $R_{X24}$).

As mentioned above, the surface acoustic wave excited in piezoelectric substrate ($P_{TX}$) is transmitted to piezoelectric substrate ($P_{RX}$) through the upper end surface of nonpiezoelectric plate (1), and is transduced to the electric signal. In this time, if the phase velocity of the surface acoustic wave is approximately equal to the phase velocity of the Rayleigh wave traveling on nonpiezoelectric plate (1) alone, the transducing efficiency from the surface acoustic wave to the electric signal increases, and in addition, the reflection caused by the miss-matching on the acoustic impedance at the boundary surface between piezoelectric substrate ($P_{RX}$) and nonpiezoelectric plate (1) never causes. In addition, as piezoelectric substrate ($P_{RX}$) is made from a piezoelectric ceramic having the polarization axis parallel to the thickness direction thereof, the transducing efficiency from the surface acoustic wave to the electric signal increases. If using a piezoelectric polymer such as PVDF and so on, as piezoelectric substrate ($P_{RX}$), the transducing efficiency from the surface acoustic wave to the electric signal increases. As the the thickness d of piezoelectric substrate ($P_{RX}$) is smaller than the interdigital periodicity P, and the thickness of nonpiezoelectric plate (1) is larger than three times the interdigital periodicity P, it is possible to increase the transmitting efficiency of the surface acoustic wave from the upper end surface of nonpiezoelectric plate (1) to piezoelectric substrate ($P_{RX}$) without a leakage of the surface acoustic wave on the inside of nonpiezoelectric plate (1). If using a material, as nonpiezoelectric plate (1), such that the phase velocity of the surface acoustic wave traveling on nonpiezoelectric plate (1) alone is higher than that traveling on piezoelectric substrate ($P_{RX}$) alone, it is possible to increase the transmitting efficiency of the surface acoustic wave from the upper end surface of nonpiezoelectric plate (1) to piezoelectric substrate ($P_{RX}$) without a leakage of the surface acoustic wave on the inside of nonpiezoelectric plate (1). Thus, it is possible to operate the surface acoustic wave position-sensing device under low power consumption and low voltage, and in addition, it is possible to support the lower end surface of nonpiezoelectric plate (1) by supporting board (2) directly.

In the same way as the case of surface acoustic wave transducing unit (X) mentioned above, when an electric signal having a frequency approximately corresponding to the interdigital periodicity P is applied to interdigital transducers ($T_{Y0}$, $T_{Y1}$ and $T_{Y2}$), respectively, the surface acoustic wave, of the first mode and the higher order modes, having the wavelength approximately equal to the interdigital periodicity P is excited in piezoelectric substrate ($P_{TY}$) effectively. The surface acoustic wave excited by interdigital transducer ($T_{Y0}$) is transmitted to piezoelectric substrate ($P_{RY}$) through the upper end surface of nonpiezoelectric plate (1), and is transduced to an electric signal with a phase $\theta_{base}$ by interdigital transducer ($R_{Y0}$), the electric signal being delivered from interdigital transducer ($R_{Y0}$) and amplified by amplifier ($A_x$). An electric signal ③ is applied to switch-change unit (6), and an electric signal ④ is applied to four phase comparators (4). Switch-change unit (6) under a control of computer (5) turns on and off switches ($W_1$ and $W_2$) alternately, and supplies a group of interdigital transducers ($T_{X1}$ and $T_{Y1}$), and a group of interdigital transducers ($T_{X2}$ and $T_{Y2}$) with the electric signal ③ alternately. The surface acoustic wave excited by interdigital transducer ($T_{Y1}$) is transmitted to piezoelectric substrate ($P_{RY}$) through the upper end surface of nonpiezoelectric plate (1), and is transduced to electric signals $E_j$ (j=1, 2, . . . , X) with phases $\theta_j$ (j=1, 2, . . . , X) by each of interdigital transducers ($R_{Y11}$, $R_{Y12}$, $R_{Y13}$ and $R_{Y14}$), the phases $\theta_j$ corresponding to the positions $F_j$, respectively. The surface acoustic wave excited by interdigital transducer ($T_{Y2}$) is transmitted to piezoelectric substrate ($P_{RY}$) through the upper end surface of nonpiezoelectric plate (1), and is transduced to electric signals $E_j$ (j=1, 2, . . . , X) with phases $\theta_j$ (j=1, 2, . . . , X) by each of interdigital transducers ($R_{Y21}$, $R_{Y22}$, $R_{Y23}$ and $R_{Y24}$), the phases $\theta_j$ corresponding to the positions $F_j$, respectively. Each electric signal $E_j$ has a frequency approximately corresponding to the interdigital periodicity P. The total phase $\Sigma\theta_j$ made by phases $\theta_j$ is zero. The total electric signal $\Sigma E_j$ made by electric signals $E_j$ is also zero and is not able to be detected at each of interdigital transducers ($R_{Y11}$, $R_{Y12}$, $R_{Y13}$, $R_{Y14}$, $R_{Y21}$, $R_{Y22}$, $R_{Y23}$ and $R_{Y24}$).

Interdigital transducer ($T_{X1}$) and interdigital transducers ($R_{X11}$, $R_{X12}$, $R_{X13}$ and $R_{X14}$) form four propagation lanes ($D_{X11}$, $D_{X12}$, $D_{X13}$ and $D_{X14}$) of the surface acoustic wave on the upper end surface of nonpiezoelectric plate (1), respectively, each propagation lane consisting of minute propagation lanes $Z_j$ (j=1, 2, . . . , X) corresponding to the positions $F_j$. Interdigital transducer ($T_{X2}$) and interdigital transducers ($R_{X21}$, $R_{X22}$, $R_{X23}$ and $R_{X24}$) form four propagation lanes ($D_{X21}$, $D_{X22}$, $D_{X23}$ and $D_{X24}$) of the surface acoustic wave on the upper end surface of nonpiezoelectric plate (1), respectively, each propagation lane consisting of minute propagation lanes $Z_j$ (j=1, 2, . . . , X) corresponding to the positions $F_j$. In the same way, interdigital transducer ($T_{Y1}$) and interdigital transducers ($R_{Y11}$, $R_{Y12}$, $R_{Y13}$ and $R_{Y14}$) form four propagation lanes ($D_{Y11}$, $D_{Y12}$, $D_{Y13}$ and $D_{Y14}$) of the surface acoustic wave on the upper end surface of nonpiezoelectric plate (1), respectively, each propagation lane consisting of minute propagation lanes $Z_j$ (j=1, 2, . . . , X) corresponding to the positions $F_j$. Interdigital transducer ($T_{Y2}$) and interdigital transducers ($R_{Y21}$, $R_{Y22}$, $R_{Y23}$ and $R_{Y24}$) form four propagation lanes ($D_{Y21}$, $D_{Y22}$, $D_{Y23}$ and $D_{Y24}$) of the surface acoustic wave on the upper end surface of nonpiezoelectric plate (1), respectively, each propagation lane consisting of minute propagation lanes $Z_j$ (j=1, 2, . . . , X) corresponding to the positions $F_j$.

When touching a position $F_x$, out of the positions $F_j$, on a minute propagation lane $Z_x$ out of the minute propagation lanes $Z_j$ of one of the propagation lanes ($D_{X11}$, $D_{X12}$, $D_{X13}$, $D_{X14}$, $D_{X21}$, $D_{X22}$, $D_{X23}$ and $D_{X24}$), an electric signal E with a phase $\theta$ is delivered from one of interdigital transducers ($R_{X11}$, $R_{X12}$, $R_{X13}$, $R_{X14}$, $R_{X21}$, $R_{X22}$, $R_{X23}$ and $R_{X24}$). In this time, only the surface acoustic wave on the minute propagation lane $Z_x$ is disappeared and is not transduced to an electric signal $E_x$ with a phase $\theta_x$. As a result, the electric signal E being equal to the total electric signal $\Sigma E_j$ minus the electric signal $E_x$ is delivered from one of interdigital transducers ($R_{X11}$, $R_{X12}$, $R_{X13}$, $R_{X14}$, $R_{X21}$, $R_{X22}$, $R_{X23}$ and $R_{X24}$), the phase $\theta$ being equal to the total phase $\Sigma\theta_j$ minus the phase $\theta_x$, that is ($\theta=\Sigma\theta_j-\theta_x=-\theta_x$). Phase comparator (4) detects a difference between the phase $\theta$ and the phase $\theta_{base}$, only when the phase comparator (4) is applied with the electric signal E. Computer (5) finds the position $F_x$ from the phase difference ($\theta_{base}-\theta$). In the same way, when touching a position $F_x$ on a minute propagation lane $Z_x$ out of one of the propagation lanes ($D_{Y11}$, $D_{Y12}$, $D_{Y13}$, $D_{Y14}$, $D_{Y21}$, $D_{Y22}$, $D_{Y23}$ and $D_{Y24}$), an electric signal E with a phase $\theta$ is delivered from one of interdigital transducers ($R_{Y11}$, $R_{Y12}$, $R_{Y13}$, $R_{Y14}$, $R_{Y21}$, $R_{Y22}$, $R_{Y23}$ and $R_{Y24}$). In this time, only the surface acoustic wave on the minute propagation lane $Z_x$ is disappeared and is not transduced to an electric signal $E_x$ with a phase $\theta_x$, the electric signal E being equal to the total electric signal $\Sigma E_j$ minus the electric signal $E_x$, the phase $\theta$ being equal to the total phase $\Sigma\theta_j$ minus the phase $\theta_x$. Phase comparator (4) detects a difference between the phase θ and the phase $\theta_{base}$, only when the phase comparator (4) is applied with the electric signal E. Computer (5) finds the position $F_x$ from the phase difference ($\theta_{base}-\theta$).

As mentioned previously, switch-change unit (6) under a control of computer (5) turns on and off switches ($W_1$ and $W_2$) alternately. At the same time, computer (5) detects switch ($W_1$ or $W_2$) closed when the electric signal E appears at one of the points $Q_{X1}$, $Q_{X2}$, $Q_{X3}$ and $Q_{X4}$. Thus, for example, if switch ($W_2$) is closed when the electric signal E appears at the point $Q_{X3}$, it is clear that the electric signal E is delivered from interdigital transducer ($R_{X23}$). Therefore, it is clear that the touch-position $F_x$ is on the minute propagation lane $Z_x$ out of the propagation lane ($D_{X23}$). In the same way, computer (5) detects switch ($W_1$ or $W_2$) closed when the electric signal E appears at the point $Q_{Y1}$, $Q_{Y2}$, $Q_{Y3}$ and $Q_{Y4}$. For example, if switch ($W_1$) is closed when the electric signal E appears at the point $Q_{Y1}$, it is clear that the touch-position $F_x$ is on the minute propagation lane $Z_x$ out of the propagation lane ($D_{Y11}$). Since eight propagation lanes ($D_{X11}$, $D_{X12}$, $D_{X13}$, $D_{X14}$, $D_{X21}$, $D_{X22}$, $D_{X23}$ and $D_{X24}$) and eight propagation lanes ($D_{Y11}$, $D_{Y12}$, $D_{Y13}$, $D_{Y14}$, $D_{Y21}$, $D_{Y22}$, $D_{Y23}$ and $D_{Y24}$) cross each other, it is clear that the touch-position $F_x$ exists on a crossing point made by the minute propagation lane $Z_x$ out of the propagation lane ($D_{X23}$) and the minute propagation lane $Z_x$ out of the propagation lane ($D_{Y11}$). In addition, eight propagation lanes ($D_{X11}$, $D_{X12}$, $D_{X13}$, $D_{X14}$, $D_{X21}$, $D_{X22}$, $D_{X23}$ and $D_{X24}$) are closed each other, and eight propagation lanes ($D_{Y11}$, $D_{Y12}$, $D_{Y13}$, $D_{Y14}$, $D_{Y21}$, $D_{Y22}$, $D_{Y23}$ and $D_{Y24}$) are also closed each other. Accordingly, there is no null touch-point on the upper end surface of nonpiezoelectric plate (1). In order to make no null touch-point, it is also effective to arrange eight propagation lanes ($D_{X11}$, $D_{X12}$, $D_{X13}$, $D_{X14}$, $D_{X21}$, $D_{X22}$, $D_{X23}$ and $D_{X24}$) as they are partially overlapping each other, and arrange eight propagation lanes ($D_{Y11}$, $D_{Y12}$, $D_{Y13}$, $D_{Y14}$, $D_{Y21}$, $D_{Y22}$, $D_{Y23}$ and $D_{Y24}$) as they are partially overlapping each other.

Figure 6:
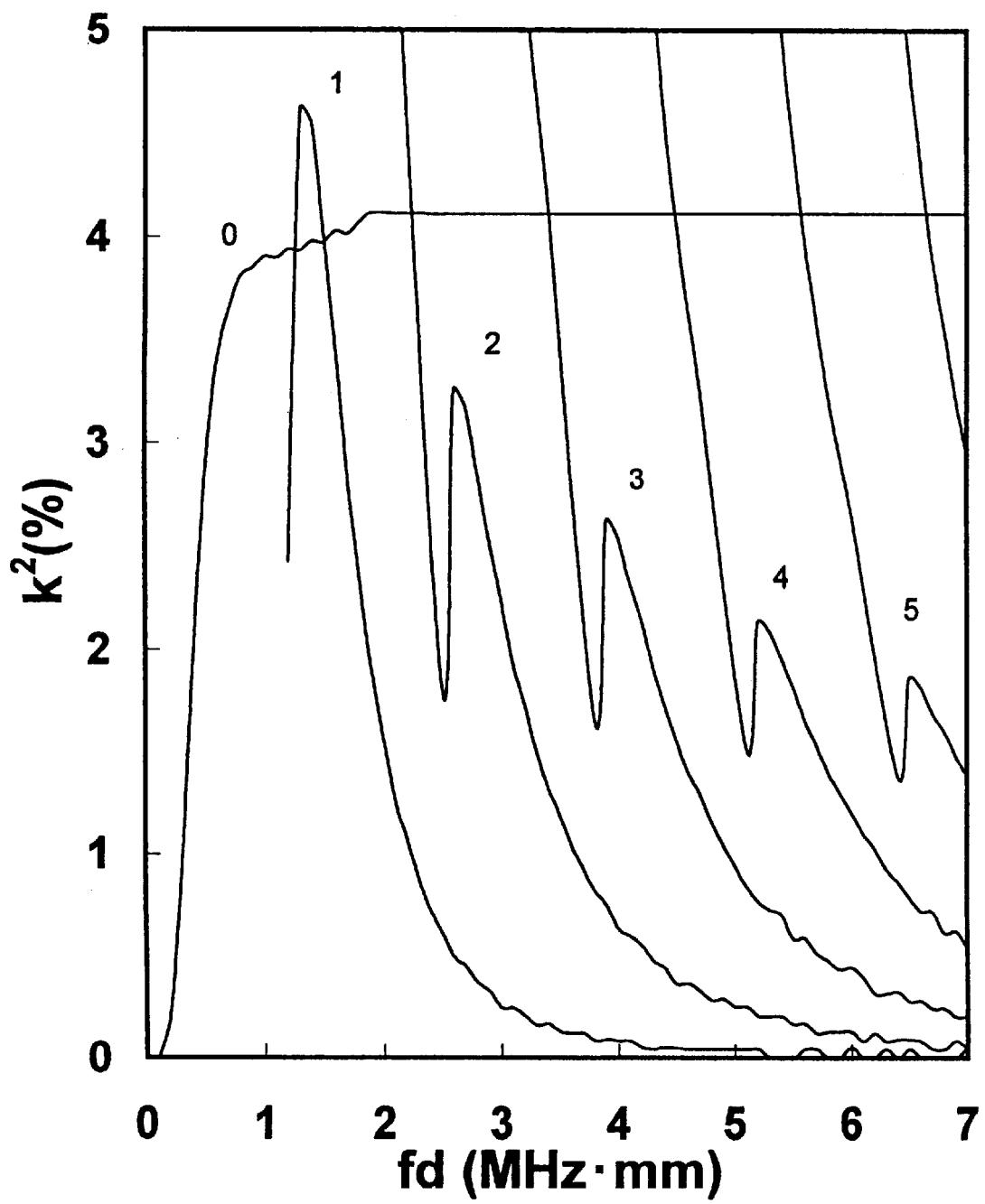
FIG. 6 shows a relationship between the $k^2$ value calculated from the difference between the phase velocity under electrically opened condition and that under electrically shorted condition of piezoelectric substrate ($P_{TX}$), and the fd value.

FIG. 6 shows a relationship between the electromechanical coupling constant $k^2$ calculated from the difference between the phase velocity under electrically opened condition and that under electrically shorted condition of piezoelectric substrate ($P_{TX}$), and the product fd of the frequency f of the surface acoustic wave and the thickness d of piezoelectric substrate ($P_{TX}$). In FIG. 6, nonpiezoelectric plate (1) is made from a glass having a shear wave velocity of 3091 m/s and a longitudinal wave velocity of 5592 m/s traveling on the glass alone. The velocities of 3091 m/s and 5592 m/s are about 1.3 times the velocities of a shear- and a longitudinal waves, 2450 m/s and 4390 m/s, respectively, in piezoelectric substrate ($P_{TX}$) alone. An electric energy applied to the input interdigital transducer is most easily transduced to the first mode surface acoustic wave when the fd value is approximately 1.3 MHz.mm, then the $k^2$ value is approximately 4.7% being the maximum value. It is clear that the $k^2$ value of 4.7% is worthy in comparison that a crystallized $LiNbO_3$ used as a popular piezoelectric body for exciting a surface acoustic wave generally has the $k^2$ value of approximately 5%.

Figure 7:
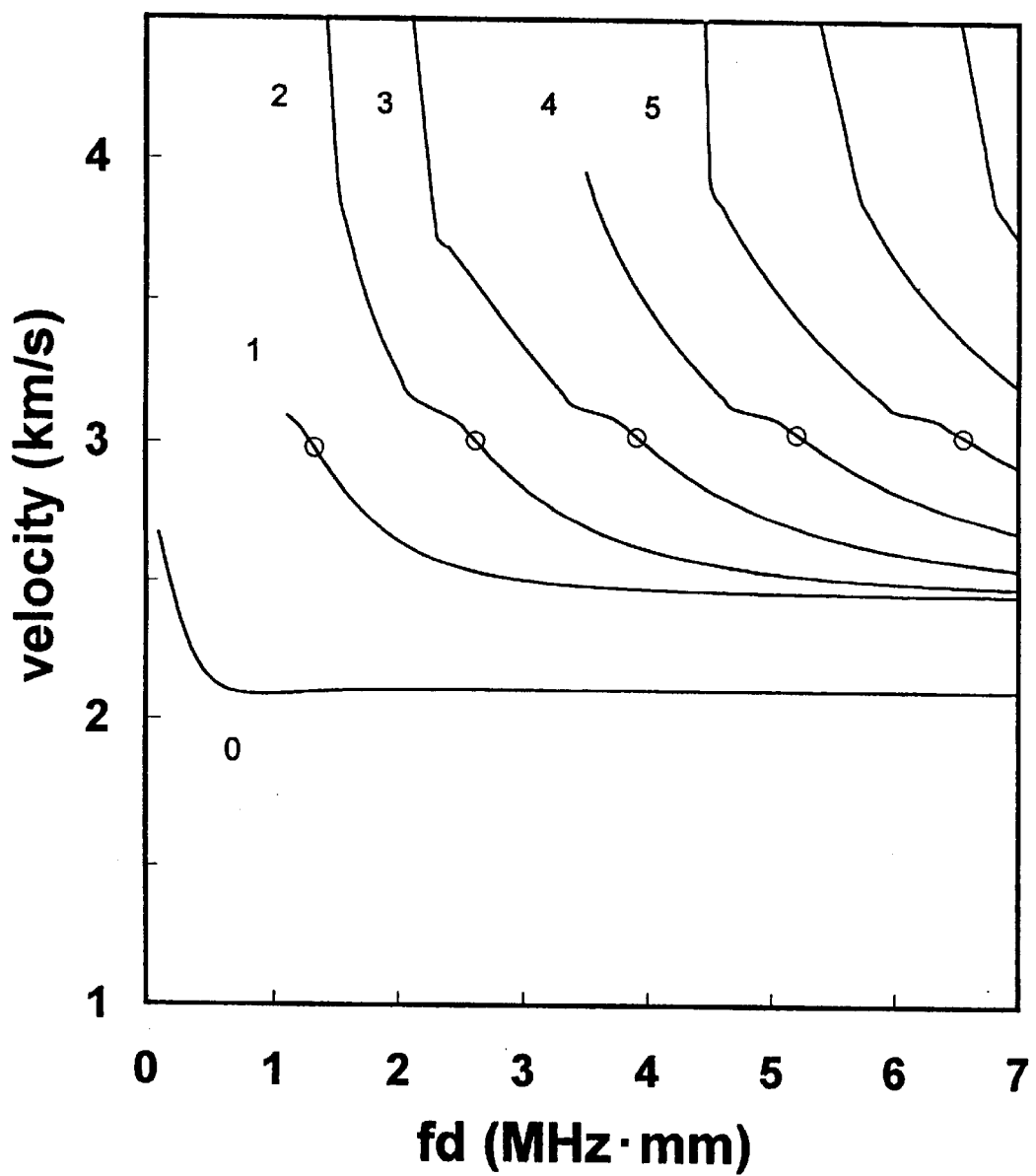
FIG. 7 shows a relationship between the phase velocity of the surface acoustic wave for each mode in piezoelectric substrate ($P_{TX}$), and the fd value.

FIG. 7 shows a relationship between the phase velocity of the surface acoustic wave for each mode in piezoelectric substrate ($P_{TX}$), and the fd value. In FIG. 7, nonpiezoelectric plate (1) is made from the same glass as FIG. 6. The fd value at each mark ○ has the maximum $k^2$ value where an electric energy applied to the input interdigital transducer is most easily transduced to the surface acoustic wave, the maximum $k^2$ value being obtained from FIG. 6. The phase velocity of the surface acoustic wave of the first mode and the higher order modes at the mark ○ is approximately 2980 m/s, which is approximately equal to the phase velocity of the Rayleigh wave traveling on nonpiezoelectric plate (1) alone, the phase velocity of the Rayleigh wave being 2850 m/s.

Figure 8:
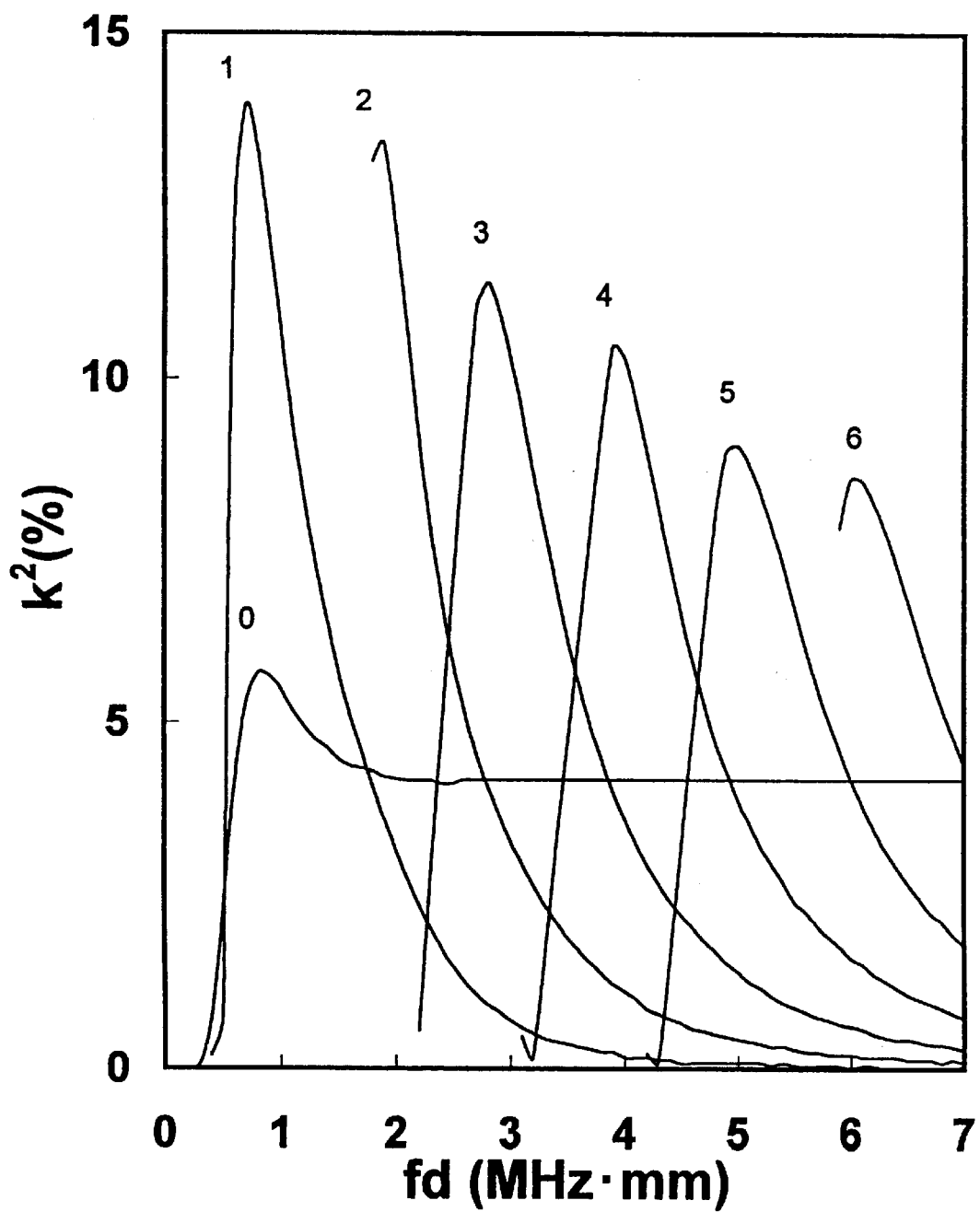
FIG. 8 shows a relationship between the $k^2$ value and the fd value.

FIG. 8 shows a relationship between the $k^2$ value and the fd value. In FIG. 8, nonpiezoelectric plate (1) is made from a glass having a shear wave velocity of 4203 m/s and a longitudinal wave velocity of 7604 m/s traveling on the glass alone. The velocities of 4203 m/s and 7604 m/s are about 1.7 times the velocities of a shear- and a longitudinal waves, 2450 m/s and 4390 m/s, respectively, in piezoelectric substrate ($P_{TX}$) alone. An electric energy applied to the input interdigital transducer is most easily transduced to the first mode surface acoustic wave when the fd value is approximately 0.7 MHz.mm, then the $k^2$ value is approximately 14.0% being the maximum value.

Figure 9:
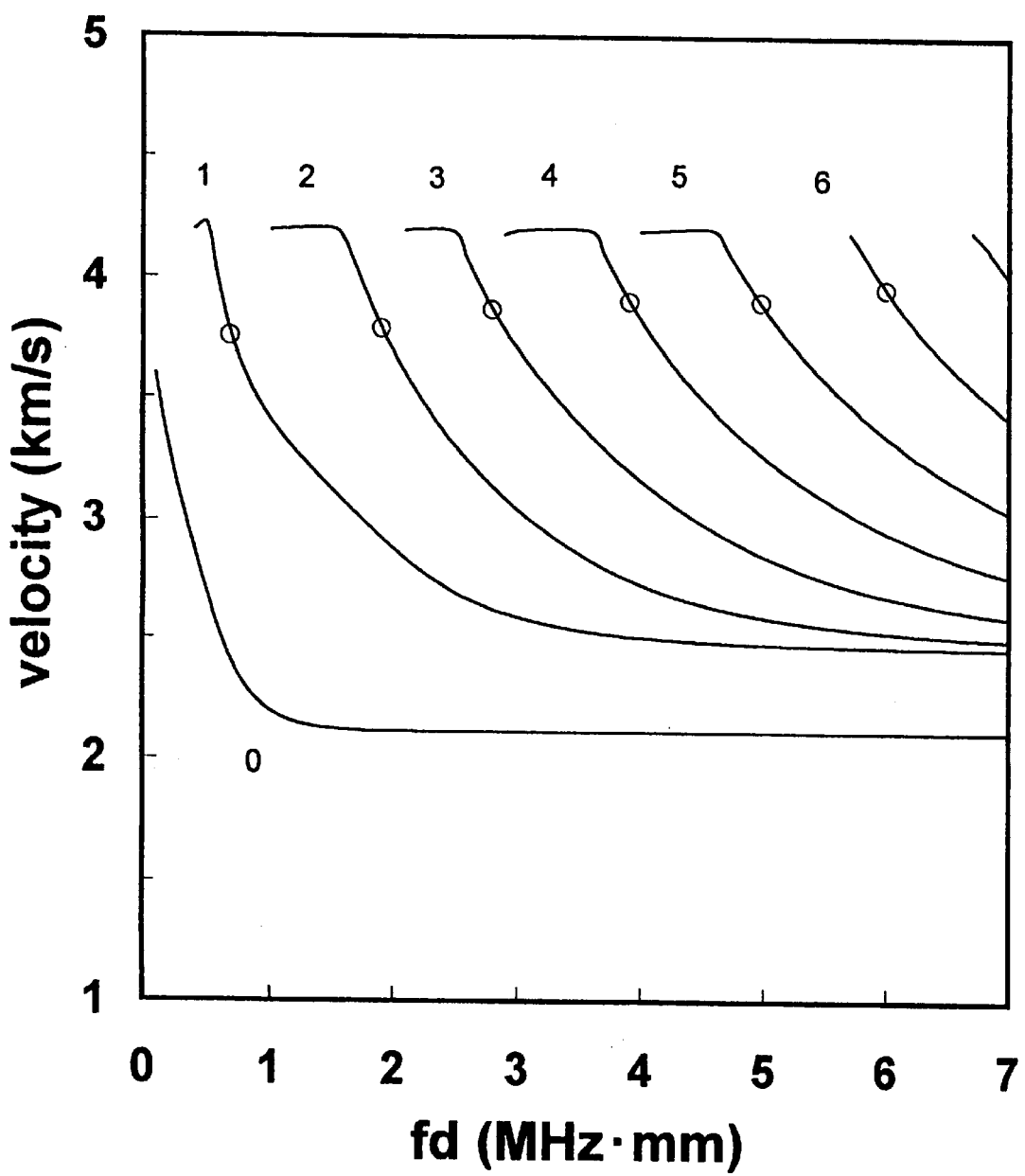
FIG. 9 shows a relationship between the phase velocity of the surface acoustic wave with each mode in piezoelectric substrate ($P_{TX}$), and the fd value.

FIG. 9 shows a relationship between the phase velocity of the surface acoustic wave with each mode in piezoelectric substrate ($P_{TX}$), and the fd value. In FIG. 9, nonpiezoelectric plate (1) is made from the same glass as FIG. 8. The fd value at each mark ○ has the maximum $k^2$ value where an electric energy applied to the input interdigital transducer is most easily transduced to the surface acoustic wave, the maximum $k^2$ value being obtained from FIG. 8. The phase velocity of the surface acoustic wave of the first mode and the higher order modes at the mark ○ is approximately 3800 m/s, which is approximately equal to the phase velocity of the Rayleigh wave traveling on nonpiezoelectric plate (1) alone, the phase velocity of the Rayleigh wave being 3860 m/s.

It is clear from FIGS. 6~9 that an electric energy applied to the input interdigital transducer is most easily transduced to the surface acoustic wave of the first mode and the higher order modes having the phase velocity approximately equal to the phase velocity of the Rayleigh wave traveling on nonpiezoelectric plate (1) alone. In the same way, the surface acoustic wave, of the first mode and the higher order modes, having the phase velocity approximately equal to the phase velocity of the Rayleigh wave traveling on nonpiezoelectric plate (1) alone, is most easily transduced to an electric signal at the output interdigital transducer.

Figure 10:
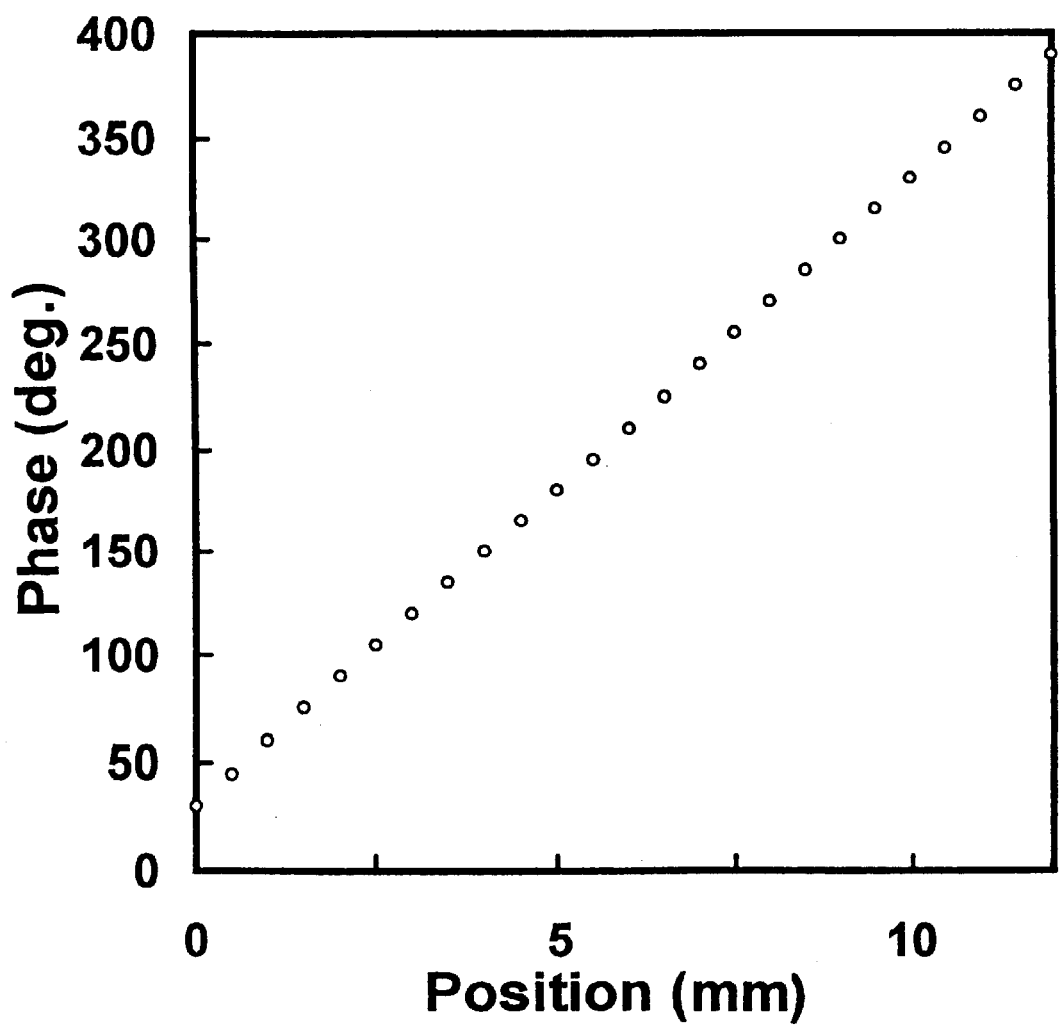
FIG. 10 shows a relationship between a touch-position $F_x$ and a phase difference ($\theta_{base}-\theta$) detected by phase comparator (4).

FIG. 10 shows a relationship between a touch-position $F_x$ and a phase difference ($\theta_{base}-\theta$) detected by phase comparator (4). The distance between the touch-position $F_x$ and a touch-position $F_{x+1}$ is 0.5 mm. There exists a linear relationship between the touch-position $F_x$ and the phase difference ($\theta_{base}-\theta$).

Figure 11:
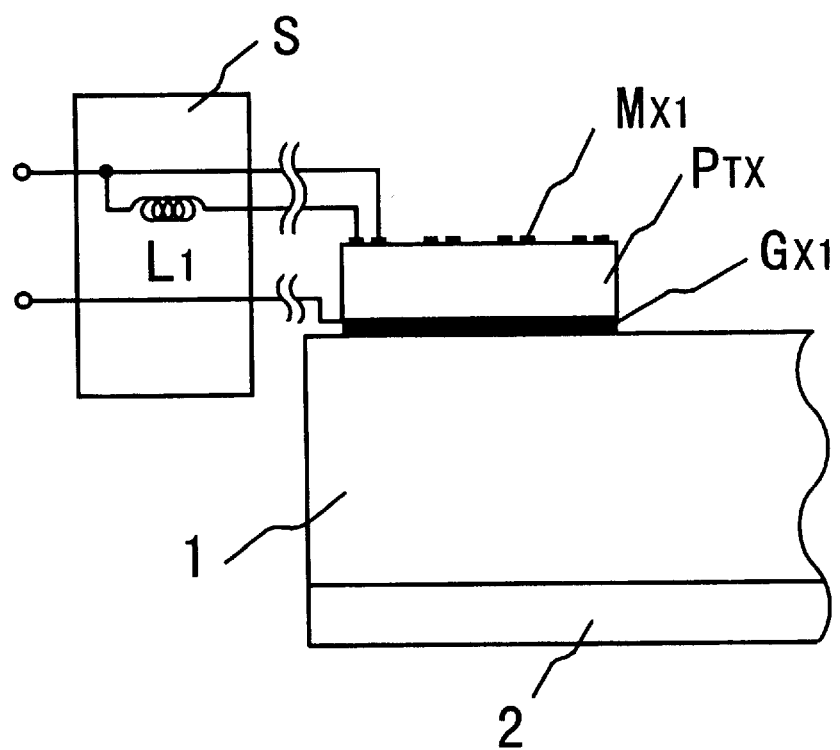
FIG. 11 shows a fragmentary sectional view of a surface acoustic wave position-sensing device according to a second embodiment of the present invention.

FIG. 11 shows a fragmentary sectional view of a surface acoustic wave position-sensing device according to a second embodiment of the present invention. The surface acoustic wave position-sensing device comprises nonpiezoelectric plate (1), supporting board (2), controlling system (3), a pair of switches ($W_{11}$ and $W_{12}$), a pair of switches ($W_{21}$ and $W_{22}$), amplifier ($A_x$), earth electrodes ($G_{X1}$, $G_{X2}$, $G_{Y1}$ and $G_{Y2}$), phase shifter (S) and surface acoustic wave transducing units (X and Y). Surface acoustic wave transducing unit (X) in FIG. 11 has the same construction as that in FIG. 1, except for using of interdigital transducers ($M_{X1}$ and $M_{X2}$) in place of interdigital transducers ($T_{X1}$ and $T_{X2}$). Surface acoustic wave transducing unit (Y) in FIG. 11 has the same construction as that in FIG. 1, except for using of interdigital transducers ($M_{Y1}$ and $M_{Y2}$) in place of interdigital transducers ($T_{Y1}$ and $T_{Y2}$). FIG. 11 shows only nonpiezoelectric plate (1), supporting board (2), piezoelectric substrate ($P_{TX}$), interdigital transducer ($M_{X1}$), earth electrode ($G_{X1}$) and phase shifter (S) including coil $L_1$. Earth electrodes ($G_{X1}$, $G_{X2}$, $G_{Y1}$ and $G_{Y2}$), made from aluminium thin film, have the same constructions. Earth electrodes ($G_{X1}$ and $G_{X2}$), corresponding with interdigital transducers ($M_{X1}$ and $M_{X2}$), respectively, are formed on the lower end surface of piezoelectric substrate ($P_{TX}$). Earth electrodes ($G_{Y1}$ and $G_{Y2}$), corresponding with interdigital transducers ($M_{Y1}$ and $M_{Y2}$), respectively, are formed on the lower end surface of piezoelectric substrate ($P_{TY}$).

Figure 12:
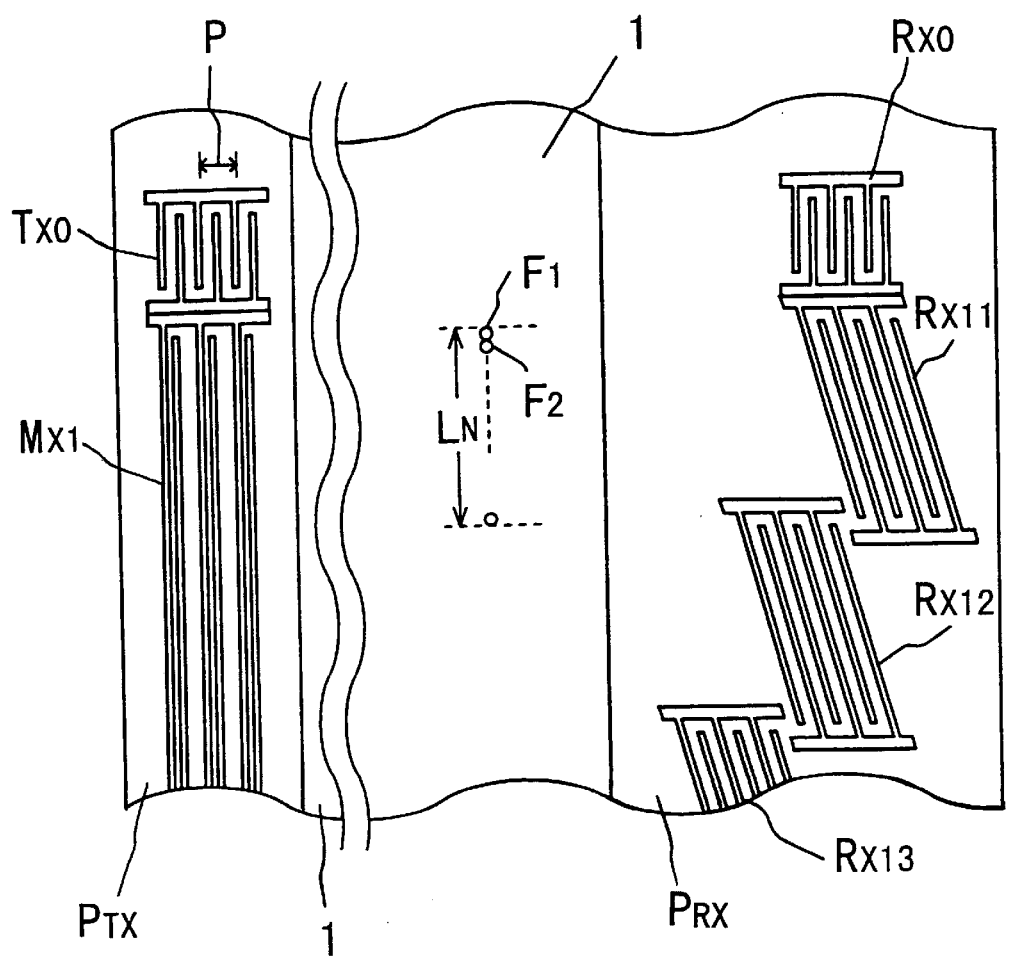
FIG. 12 shows a fragmentary plan view, on an enlarged scale, of the surface acoustic wave position-sensing device in FIG. 11.

FIG. 12 shows a fragmentary plan view, on an enlarged scale, of the surface acoustic wave position-sensing device in FIG. 11. FIG. 12 shows only nonpiezoelectric plate (1), the piezoelectric substrates, and the interdigital transducers. Each of interdigital transducers ($M_{X1}$, $M_{X2}$, $M_{Y1}$ and $M_{Y2}$) consists of ten finger pairs, and has an interdigital periodicity P of 400 μm and an overlap length L of 12 mm. The sum of each overlap length $L_N$, along the finger direction of interdigital transducer ($M_{X1}$), of interdigital transducers ($R_{X11}$, $R_{X12}$, $R_{X13}$ and $R_{X14}$) is equal to the overlap length L. The sum of each overlap length $L_N$, along the finger direction of interdigital transducer ($M_{X2}$), of interdigital transducers ($R_{X21}$, $R_{X22}$, $R_{X23}$ and $R_{X24}$) is equal to the overlap length L. The sum of each overlap length $L_N$, along the finger direction of interdigital transducer ($M_{Y1}$), of interdigital transducers ($R_{Y11}$, $R_{Y12}$, $R_{Y13}$ and $R_{Y14}$) is equal to the overlap length L. The sum of each overlap length $L_N$, along the finger direction of interdigital transducer ($M_{Y2}$), of interdigital transducers ($R_{Y21}$, $R_{Y22}$, $R_{Y23}$ and $R_{Y24}$) is equal to the overlap length L. In the surface acoustic wave position-sensing device, it is possible to sense a touch on one of positions $F_j$ (j=1, 2, . . . , X), along the finger direction of interdigital transducer ($M_{X1}$ or $M_{X2}$), within each overlap length $L_N$ of interdigital transducers ($R_{X11}$, $R_{X12}$, $R_{X13}$, $R_{X14}$, $R_{X21}$, $R_{X22}$, $R_{X23}$ and $R_{X24}$) on the upper end surface of non piezoelectric plate (1). In the same way, it is possible to sense a touch on one of positions $F_j$ (j=1, 2, . . . , X), along the finger direction of interdigital transducer ($M_{Y1}$ or $M_{Y2}$), within each overlap length $L_N$ of interdigital transducers ($R_{Y11}$, $R_{Y12}$, $R_{Y13}$, $R_{Y14}$, $R_{Y21}$, $R_{Y22}$, $R_{Y23}$ and $R_{Y24}$) on the upper end surface of non piezoelectric plate (1).

Each of interdigital transducers ($R_{X11}$, $R_{X12}$, $R_{X13}$, $R_{X14}$, $R_{X21}$, $R_{X22}$, $R_{X23}$ and $R_{X24}$) is, as shown in FIG. 4, located such that the finger direction thereof is slanting to that of interdigital transducer ($M_{X1}$ or $M_{X2}$) by an angle α. In the same way, each of interdigital transducers ($R_{Y11}$, $R_{Y12}$, $R_{Y13}$, $R_{Y14}$, $R_{Y21}$, $R_{Y22}$, $R_{Y23}$ and $R_{Y24}$) is located such that the finger direction thereof is slanting to that of interdigital transducer ($M_{Y1}$ and $M_{Y2}$) by an angle α. An interdigital periodicity $P_N$, along the vertical direction to the finger direction of interdigital transducers ($R_{X11}$, $R_{X12}$, $R_{X13}$, $R_{X14}$, $R_{X21}$, $R_{X22}$, $R_{X23}$ and $R_{X24}$) is, as as shown in FIG. 4, equal to the product of the interdigital periodicity P and cos α. In the same way, an interdigital periodicity $P_N$, along the vertical direction to the finger direction of interdigital transducers ($R_{Y11}$, $R_{Y12}$, $R_{Y13}$, $R_{Y14}$, $R_{Y21}$, $R_{Y22}$, $R_{Y23}$ and $R_{Y24}$) is equal to the product of the interdigital periodicity P and cos α. The sum of each overlap length $L_P$ of interdigital transducers ($R_{X11}$, $R_{X12}$, $R_{X13}$ and $R_{X14}$) is equal to the product of the overlap length L and sec α. In the same way, the sum of each overlap length $L_P$ of interdigital transducers ($R_{X21}$, $R_{X22}$, $R_{X23}$ and $R_{X24}$) is equal to the product of the overlap length L and sec α. The sum of each overlap length $L_P$ of interdigital transducers ($R_{Y11}$, $R_{Y12}$, $R_{Y13}$ and $R_{Y14}$) is equal to the product of the overlap length L and sec α. The sum of each overlap length $L_P$ of interdigital transducers ($R_{Y21}$, $R_{Y22}$, $R_{Y23}$ and $R_{Y24}$) is equal to the product of the overlap length L and sec α.

Figure 13:
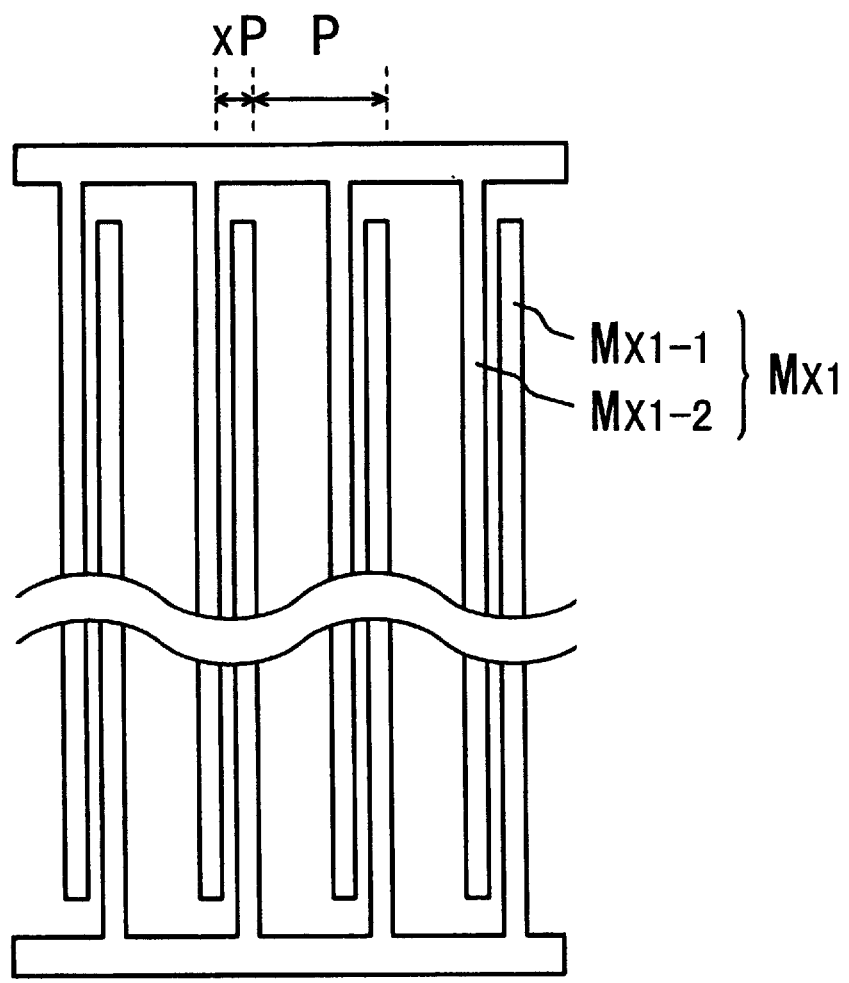
FIG. 13 shows a plan view of interdigital transducer ($M_{X1}$).

FIG. 13 shows a plan view of interdigital transducer ($M_{X1}$). Interdigital transducer ($M_{X1}$) consists of two electrodes ($M_{X1-1}$ and $M_{X1-2}$), and has two kinds of distances between one electrode finger of electrode ($M_{X1-1}$) and two neighboring electrode fingers of electrode ($M_{X1-2}$), a shorter distance xP of the two kinds of distances being 100 μm. Interdigital transducers ($M_{X1}$, $M_{X2}$, $M_{Y1}$ and $M_{Y2}$), made from aluminium thin film, have the same constructions each other.

Figure 14:
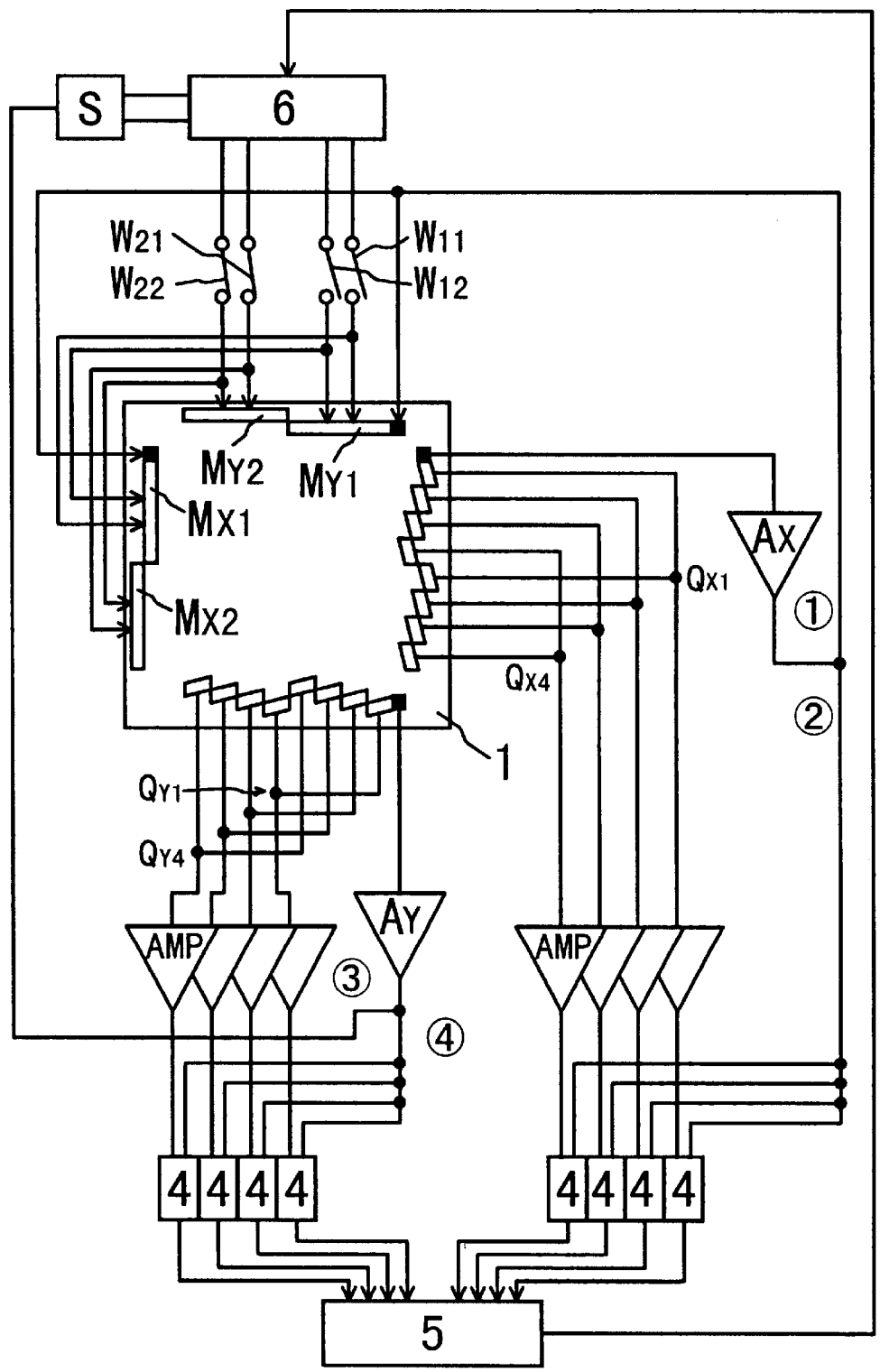
FIG. 14 shows a diagram of a driving circuit of the surface acoustic wave position-sensing device in FIG. 11.

FIG. 14 shows a diagram of a driving circuit of the surface acoustic wave position-sensing device in FIG. 11. Controlling system (3) comprises eight phase comparators (4), computer (5) and switch-change unit (6). Output terminal of switch ($W_{11}$) is connected with input terminals of interdigital transducers ($M_{X1-1}$ and $M_{Y1-1}$). Output terminal of switch ($W_{12}$) is connected with input terminals of interdigital transducers ($M_{X1-2}$ and $M_{Y1-2}$). Output terminal of switch ($W_{21}$) is connected with input terminals of interdigital transducers ($M_{X2-1}$ and $M_{Y2-1}$). Output terminal of switch ($W_{22}$) is connected with input terminals of interdigital transducers ($M_{X2-2}$ and $M_{Y2-2}$). A point $Q_{X1}$ joining output terminals of interdigital transducers ($R_{X11}$ and $R_{X21}$), a point $Q_{X2}$ joining output terminals of interdigital transducers ($R_{X12}$ and $R_{X22}$), a point $Q_{X3}$ joining output terminals of interdigital transducers ($R_{X13}$ and $R_{X22}$), and a point $Q_{X4}$ joining output terminals of interdigital transducers ($R_{X14}$ and $R_{X24}$) are connected with phase comparators (4) via amplifiers (AMP), respectively. In the same way, a point $Q_{Y1}$ joining output terminals of interdigital transducers ($R_{Y11}$ and $R_{Y22}$), a point $Q_{Y2}$ joining output terminals of interdigital transducers ($R_{Y12}$ and $R_{Y22}$), a point $Q_{Y3}$ joining output terminals of interdigital transducers ($R_{Y13}$ and $R_{Y23}$), and a point $Q_{Y4}$ joining output terminals of interdigital transducers ($R_{Y14}$ and $R_{Y24}$) are connected with phase comparators (4) via amplifiers (AMP), respectively.

Interdigital transducers ($T_{X0}$, $R_{X0}$, $T_{Y0}$ and $R_{Y0}$) in FIG. 14 have the same function as that in FIG. 5. In addition, interdigital transducers ($R_{X11}$, $R_{X12}$, $R_{X13}$, $R_{X14}$, $R_{X21}$, $R_{X22}$, $R_{X23}$, $R_{X24}$, $R_{Y11}$, $R_{Y12}$, $R_{Y13}$, $R_{Y14}$, $R_{Y21}$, $R_{Y22}$, $R_{Y23}$ and $R_{Y24}$) in FIG. 14 have the same function as that in FIG. 5.

In the driving circuit in FIG. 14, electric signals $V_1$ and $V_2$, with a frequency approximately corresponding to the interdigital periodicity P and having the phase difference 2πy, are applied between electrode ($M_{X1-1}$) and earth electrode ($G_{X1}$), and between electrode ($M_{X1-2}$) and earth electrode ($G_{X1}$), respectively. In this time, an unidirectional surface acoustic wave, of the first mode and the higher order modes, having the wavelength approximately equal to the interdigital periodicity P is excited in piezoelectric substrate ($P_{TX}$), on condition that x<½ in the shorter distance xP of interdigital transducer ($M_{X1}$), and x+y=±½ in the phase difference 2πy. If x=¼, y=¼ or y=-¾. Thus, the unidirectional surface acoustic wave is excited in piezoelectric substrate ($P_{TX}$), on condition that xP=100 μm as shown in FIG. 13, and 2πy=π/2(90°) or 2πy=-3π/2(-270°). The excitation of the unidirectional surface acoustic wave generates no reflection of a surface acoustic wave at the side surface of piezoelectric substrate, so that seldom or never makes a noise. In addition, the excitation of the unidirectional surface acoustic wave reduces a waste of an electric energy applied to interdigital transducer ($M_{X1}$), causing the surface acoustic wave position-sensing device in FIG. 11 to be operated under low power consumption with low voltage.

As mentioned above, the unidirectional surface acoustic wave is excited in piezoelectric substrate ($P_{TX}$) by interdigital transducer ($M_{X1}$) and earth electrode ($G_{X1}$). In the same way, an unidirectional surface acoustic wave is excited in piezoelectric substrate ($P_{TX}$) by interdigital transducer ($M_{X2}$) and earth electrode ($G_{X2}$). An unidirectional surface acoustic wave is excited in piezoelectric substrate ($P_{TY}$) by interdigital transducer ($M_{Y1}$) and earth electrode ($G_{Y1}$). An unidirectional surface acoustic wave is excited in piezoelectric substrate ($P_{TY}$) by interdigital transducer ($M_{Y2}$) and earth electrode ($G_{Y2}$). An electric signal ③ is applied to switch-change unit (6) via phase shifter (S). Switch-change unit (6) under a control of computer (5) turns on and off the pair of switches ($W_{11}$ and $W_{12}$) and the pair of switches ($W_{21}$ and $W_{22}$) alternately, and supplies a group of interdigital transducers ($M_{X1}$ and $M_{Y1}$) and a group of interdigital transducers ($M_{X2}$ and $M_{Y2}$) with the electric signal ③ alternately. In this time, switches ($W_{11}$ and $W_{12}$) are in the same condition each other, and switches ($W_{21}$ and $W_{22}$) are in the same condition each other.

The surface acoustic wave excited by interdigital transducer ($M_{X1}$) is transduced to electric signals $E_j$ (j=1, 2, ..., X) with phases $\theta_j$ (j=1, 2, ..., X) by each of interdigital transducers ($R_{X11}$, $R_{X12}$, $R_{X13}$ and $R_{X14}$). The surface acoustic wave excited by interdigital transducer ($M_{X2}$) is transduced to electric signals $E_j$ (j=1, 2, ..., X) with phases $\theta_j$ (j=1, 2, ..., X) by each of interdigital transducers ($R_{X21}$, $R_{X22}$, $R_{X23}$ and $R_{X24}$). The surface acoustic wave excited by interdigital transducer ($M_{Y1}$) is transduced to electric signals $E_j$ (j=1, 2, ..., X) with phases $\theta_j$ (j=1, 2, ..., X) by each of interdigital transducers ($R_{Y11}$, $R_{Y12}$, $R_{Y13}$ and $R_{Y14}$). The surface acoustic wave excited by interdigital transducer ($M_{Y2}$) is transduced to electric signals $E_j$ (j=1, 2, ..., X) with phases $\theta_j$ (j=1, 2, ..., X) by each of interdigital transducers ($R_{Y21}$, $R_{Y22}$, $R_{Y23}$ and $R_{Y24}$). The phases $\theta_j$ correspond to the positions $F_j$, respectively. Each electric signal $E_j$ has a frequency approximately corresponding to the interdigital periodicity P. The total phase $\Sigma\theta_j$ made by the phases $\theta_j$ is zero. The total electric signal $\Sigma E_j$ made by the electric signals $E_j$ is also zero and is not able to be detected at each of interdigital transducers ($R_{X11}$, $R_{X12}$, $R_{X13}$, $R_{X14}$, $R_{X21}$, $R_{X22}$, $R_{X23}$, $R_{X24}$, $R_{Y11}$, $R_{Y12}$, $R_{Y13}$, $R_{Y14}$, $R_{Y21}$, $R_{Y22}$, $R_{Y23}$ and $R_{Y24}$).

Interdigital transducer ($M_{X1}$) and interdigital transducers ($R_{X11}$, $R_{X12}$, $R_{X13}$ and $R_{X14}$) form four propagation lanes ($D_{X11}$, $D_{X12}$, $D_{X13}$ and $D_{X14}$) of the surface acoustic wave on the upper end surface of nonpiezoelectric plate (1), respectively. Interdigital transducer ($M_{X2}$) and interdigital transducers ($R_{X21}$, $R_{X22}$, $R_{X23}$ and $R_{X24}$) form four propagation lanes ($D_{X21}$, $D_{X22}$, $D_{X23}$ and $D_{X24}$) of the surface acoustic wave on the upper end surface of nonpiezoelectric plate (1), respectively. Interdigital transducer ($M_{Y1}$) and interdigital transducers ($R_{Y11}$, $R_{Y12}$, $R_{Y13}$ and $R_{Y14}$) form four propagation lanes ($D_{Y11}$, $D_{Y12}$, $D_{Y13}$ and $D_{Y14}$) of the surface acoustic wave on the upper end surface of nonpiezoelectric plate (1), respectively. Interdigital transducer ($M_{Y2}$) and interdigital transducers ($R_{Y21}$, $R_{Y22}$, $R_{Y23}$ and $R_{Y24}$) form four propagation lanes ($D_{Y21}$, $D_{Y22}$, $D_{Y23}$ and $D_{Y24}$) of the surface acoustic wave on the upper end surface of nonpiezoelectric plate (1), respectively. Each of propagation lanes ($D_{X11}$, $D_{X12}$, $D_{X13}$, $D_{X14}$, $D_{X21}$, $D_{X22}$, $D_{X23}$, $D_{X24}$, $D_{Y11}$, $D_{Y12}$, $D_{Y13}$, $D_{Y14}$, $D_{Y21}$, $D_{Y22}$, $D_{Y23}$ and $D_{Y24}$) consists of minute propagation lanes $Z_j$ (j=1, 2, ..., X) corresponding to the positions $F_j$. Eight propagation lanes ($D_{X11}$, $D_{X12}$, $D_{X13}$, $D_{X14}$, $D_{X21}$, $D_{X22}$, $D_{X23}$ and $D_{X24}$) and eight propagation lanes ($D_{Y11}$, $D_{Y12}$, $D_{Y13}$, $D_{Y14}$, $D_{Y21}$, $D_{Y22}$, $D_{Y23}$ and $D_{Y24}$) cross each other. In addition, eight propagation lanes ($D_{X11}$, $D_{X12}$, $D_{X13}$, $D_{X14}$, $D_{X21}$, $D_{X22}$, $D_{X23}$ and $D_{X24}$) are closed each other, and eight propagation lanes ($D_{Y11}$, $D_{Y12}$, $D_{Y13}$, $D_{Y14}$, $D_{Y21}$, $D_{Y22}$, $D_{Y23}$ and $D_{24}$) are also closed each other.

When touching a position $F_x$, out of the positions $F_j$ in FIG. 12, on a minute propagation lane $Z_x$ out of the minute propagation lanes $Z_j$ of one of the propagation lanes ($D_{X11}$, $D_{X12}$, $D_{X13}$, $D_{X14}$, $D_{X21}$, $D_{X22}$, $D_{X23}$ and $D_{X24}$), an electric signal E with a phase $\theta$ is delivered from one of interdigital transducers ($R_{X11}$, $R_{X12}$, $R_{X13}$, $R_{X14}$, $R_{X21}$, $R_{X22}$, $R_{X23}$ and $R_{X24}$). In this time, only the surface acoustic wave on the minute propagation lane $Z_x$ is disappeared and is not transduced to an electric signal $E_x$ with a phase $\theta_x$, the electric signal E being equal to the total electric signal $\Sigma E_j$ minus the electric signal $E_x$, the phase $\theta$ being equal to the total phase $\Sigma\theta_j$ minus the phase $\theta_x$. Phase comparator (4) detects a difference between the phase $\theta$ and the phase $\theta_{base}$, only when the phase comparator (4) is applied with the electric signal E. Computer (5) finds the position $F_x$ from the phase difference ($\theta_{base}-\theta$). In the same way, when touching a position $F_x$ on a minute propagation lane $Z_x$ out of one of the propagation lanes ($D_{Y11}$, $D_{Y12}$, $D_{Y13}$, $D_{Y14}$, $D_{Y21}$, $D_{Y22}$, $D_{Y23}$ and $D_{Y24}$), an electric signal E with a phase $\theta$ is delivered from one of interdigital transducers ($R_{Y11}$, $R_{Y12}$, $R_{Y13}$, $R_{Y14}$, $R_{Y21}$, $R_{Y22}$, $R_{Y23}$ and $R_{Y24}$). In this time, only the surface acoustic wave on the minute propagation lane $Z_x$ is disappeared and is not transduced to an electric signal $E_x$ with a phase $\theta_x$, the electric signal E being equal to the total electric signal $\Sigma E_j$ minus the electric signal $E_x$, the phase $\theta$ being equal to the total phase $\Sigma\theta_j$ minus the phase $\theta_x$. Phase comparator (4) detects a difference between the phase $\theta$ and the phase $\theta_{base}$, only when the phase comparator (4) is applied with the electric signal E. Computer (5) finds the position $F_x$ from the phase difference ($\theta_{base}-\theta$).

As mentioned previously, switch-change unit (6) under a control of computer (5) in FIG. 14 turns on and off the pair of switches ($W_{11}$ and $W_{12}$) and the pair of switches ($W_{21}$ and $W_{22}$) alternately. At the same time, computer (5) detects the pair of switches ($W_{11}$ and $W_{12}$) or the pair of switches ($W_{21}$ and $W_{22}$) closed when the electric signal E appears at one of the points $Q_{X1}$, $Q_{X2}$, $Q_{X3}$ and $Q_{X4}$. In the same way, computer (5) detects the pair of switches ($W_{11}$ and $W_{12}$) or the pair of switches ($W_{21}$ and $W_{22}$) closed when the electric signal E appears at the point $Q_{Y1}$, $Q_{Y2}$, $Q_{Y3}$ and $Q_{Y4}$. Thus, for example, if the pair of switches ($W_{21}$ and $W_{22}$) is closed when the electric signal E appears at the point $Q_{X3}$, it is clear that the electric signal E is delivered from interdigital transducer ($R_{X23}$). On the other hand, if the pair of switches ($W_{11}$ and $W_{12}$) is closed when the electric signal E appears at the point $Q_{Y1}$, it is clear that the electric signal E is delivered from interdigital transducer ($R_{Y11}$). Accordingly, it is clear that the touch-position $F_x$ exists on a crossing point made by the minute propagation lane $Z_x$ out of the propagation lane ($D_{X23}$) and the minute propagation lane $Z_x$ out of the propagation lane ($D_{Y11}$).

Compared with the surface acoustic wave position-sensing device in FIG. 1, the surface acoustic wave position-sensing device in FIG. 11 can be operated under still lower power consumption owing to the excitation of the unidirectional surface acoustic wave. In addition, no reflection of a surface acoustic wave generates at the side surface of the piezoelectric substrate in FIG. 11 because of the excitation of the unidirectional surface acoustic wave. Therefore, the surface acoustic wave position-sensing device in FIG. 11 has little or no noise, so that has a still higher sensitivity.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A surface acoustic wave position-sensing device comprising:

two surface acoustic wave transducing units X and Y, each thereof consisting of
a piezoelectric substrate $P_T$ having two end surfaces running perpendicular to the direction of the thickness d thereof,
a piezoelectric substrate $P_R$ having two end surfaces running perpendicular to the direction of the thickness d thereof,
an input interdigital transducer $T_o$ formed on one end surface of said piezoelectric substrate $P_T$,
N input interdigital transducers $T_i$ (i=1, 2, ..., N) formed on said one end surface of said piezoelectric substrate $P_T$,
an output interdigital transducer $R_o$ opposed to said interdigital transducer $T_o$, said interdigital transducer $R_o$ being formed on one end surface of said piezoelectric substrate $P_R$ and placed such that the finger direction of said interdigital transducer $R_o$ runs parallel with that of said interdigital transducer $T_o$, said thickness d of said piezoelectric substrates $P_T$ and $P_R$ being smaller than an interdigital periodicity P of said interdigital transducers $T_o$, $T_i$ and $R_o$, and
at least two output interdigital transducers $R_{i1}$ and $R_{i2}$ (i=1, 2, ..., N) opposed to each interdigital transducer $T_i$, said interdigital transducers $R_{i1}$ and $R_{i2}$ being formed on said one end surface of said piezoelectric substrate $P_R$ such that the finger direction of said interdigital transducers $R_{i1}$ and $R_{i2}$ is slanting to that of said interdigital transducer $T_i$ by an angle $\alpha$, respectively, an interdigital periodicity $P_N$ along the vertical direction to the finger direction of said interdigital transducers $R_{i1}$ and $R_{i2}$ being equal to the product of said interdigital periodicity P and cos $\alpha$;

a nonpiezoelectric plate having an upper- and a lower end surfaces running perpendicular to the thickness direction thereof, the thickness of said nonpiezoelectric plate being larger than three times said interdigital periodicity P, said piezoelectric substrates $P_T$ and $P_R$ being mounted on said upper end surface of said nonpiezoelectric plate; and a controlling system connected with said surface acoustic wave transducing units X and Y,
each of said interdigital transducers $T_o$ and $T_i$ receiving an electric signal with a frequency approximately corresponding to said interdigital periodicity P, exciting a surface acoustic wave of the first mode and the higher order modes in said piezoelectric substrate $P_T$, and transmitting said surface acoustic wave having the wavelength approximately equal to said interdigital periodicity P to said piezoelectric substrate $P_R$ through said upper end surface of said nonpiezoelectric plate, the phase velocity of said surface acoustic wave of said first mode and said higher order modes being approximately equal to the phase velocity of the Rayleigh wave traveling on said nonpiezoelectric plate alone,
said interdigital transducer $R_o$ transducing said surface acoustic wave excited by said interdigital transducer $T_o$ to an electric signal with a phase $\theta_{base}$ and delivering said electric signal,
each of said interdigital transducers $R_{i1}$ and $R_{i2}$ transducing said surface acoustic wave excited by each interdigital transducer $T_i$ to electric signals $E_j$ (j=1, 2, ..., X) with phases $\theta_j$ (j=1, 2, ..., X), respectively, said phases $\theta_j$ corresponding to positions $F_j$ (j=1, 2, ..., X) on said upper end surface of said nonpiezoelectric plate, respectively, each electric signal $E_j$ having a frequency approximately corresponding to said interdigital periodicity P, the total phase $\Sigma\theta_j$ made by said phases $\theta_j$ being zero, the total electric signal $\Sigma E_j$ made by said electric signals $E_j$ being zero and not able to be detected at each of said interdigital transducers $R_{i1}$ and $R_{i2}$,
said nonpiezoelectric plate being made of a material such that the phase velocity of the surface acoustic wave traveling on said nonpiezoelectric plate alone is higher than that traveling on said piezoelectric substrates $P_T$ and $P_R$ alone,
said interdigital transducers $T_i$ and $R_{i1}$ forming N propagation lanes $D_{i1}$ (i=1, 2, ..., N) of the surface acoustic wave on said upper end surface of said nonpiezoelectric plate, each propagation lane $D_{i1}$ consisting of minute propagation lanes $Z_j$ (j=1, 2, ..., X) corresponding to said positions $F_j$,
said interdigital transducers $T_i$ and $R_{i2}$ forming N propagation lanes $D_{i2}$ (i=1, 2, ..., N) of the surface acoustic wave on said upper end surface of said nonpiezoelectric plate, each propagation lane $D_{i2}$ consisting of minute propagation lanes $Z_j$ (j=1, 2, ..., X) corresponding to said positions $F_j$,
one of said interdigital transducers $R_{i1}$ and $R_{i2}$ delivering an electric signal E with a phase $\theta$ only when touching a position $F_x$, out of said positions $F_j$, on a minute propagation lane $Z_x$ out of said minute propagation lanes $Z_j$, said position $F_x$ corresponding to an electric signal $E_x$ with a phase $\theta_x$, said total electric signal $\Sigma E_j$ minus said electric signal $E_x$ being equal to said electric signal E, said total phase $\Sigma\theta_j$ minus said phase $\theta_x$ being equal to said phase $\theta$,
said controlling system sensing a touch with a finger or others on said position $F_x$ by an appearance of said electric signal E at said one of said interdigital transducers $R_{i1}$ and $R_{i2}$, and finding said position $F_x$ by detecting said one, delivering said electric signal E, of said interdigital transducers $R_{i1}$ and $R_{12}$, and by evaluating a difference between said phases $\theta$ and $\theta_{base}$.

2. A surface acoustic wave position-sensing device as defined in claim 1 further comprising:
N switches $W_i$ (i=1, 2, ..., N) corresponding to said interdigital transducers $T_i$, an output terminal of each switch $W_i$ being connected with an input terminal of each interdigital transducer $T_i$,
output terminals of said interdigital transducers $R_{i1}$ being connected with each other at an output point $Q_1$,
output terminals of said interdigital transducers $R_{i2}$ being connected with each other at an output point $Q_2$,
said controlling system turning on and off said switches $W_i$ with a fixed period in turn, sensing a touch on said position $F_x$ by an appearance of said electric signal E at one of said output points $Q_1$ and $Q_2$, and finding said position $F_x$ by detecting said one, delivering said electric signal E, of said output points $Q_1$ and $Q_2$, by choosing a closed one out of said switches $W_i$ when said electric signal E appears, and by evaluating said difference between said phases $\theta$ and $\theta_{base}$.

3. A surface acoustic wave position-sensing device as defined in claim 1, wherein the sum of an overlap length $L_P$ along the finger direction of said interdigital transducer $R_{i1}$ and that of said interdigital transducer $R_{i2}$ is approximately equal to the product of an overlap length L of said interdigital transducer $T_i$ and sec $\alpha$.

4. A surface acoustic wave position-sensing device as defined in claim 1, wherein two neighbors of said propagation lanes $D_{i1}$ and $D_{i2}$ are closed or partially overlapping each other.

5. A surface acoustic wave position-sensing device as defined in claim 1, wherein said propagation lanes $D_{i1}$ and $D_{i2}$ of said surface acoustic wave transducing unit X and that of said surface acoustic wave transducing unit Y are vertical to each other.

6. A surface acoustic wave position-sensing device as defined in claim 1 further comprising:
an amplifier $A_x$, an input terminal of said interdigital transducer $R_o$ of said surface acoustic wave transducing unit X being connected with each input terminal of said interdigital transducer $T_o$ of said surface acoustic wave transducing units X and Y via said amplifier $A_x$,
said interdigital transducers $T_o$ and $R_o$ in said surface acoustic wave transducing unit X, a propagation lane of a surface acoustic wave between said interdigital transducers $T_o$ and $R_o$ in said surface acoustic wave transducing unit X, and said amplifier $A_x$ forming an oscillator.

7. A surface acoustic wave position-sensing device as defined in claim 1, wherein each of said piezoelectric substrates $P_T$ and $P_R$ is made of a piezoelectric ceramic, the polarization axis thereof being parallel to the thickness direction thereof.

8. A surface acoustic wave position-sensing device as defined in claim 1, wherein each of said piezoelectric substrates $P_T$ and $P_R$ is made of a piezoelectric polymer such as PVDF and so on.

9. A surface acoustic wave position-sensing device as defined in claim 1 further comprising a supporting board cemented to said lower end surface of said nonpiezoelectric plate.

10. A surface acoustic wave position-sensing device comprising:
two surface acoustic wave transducing units X and Y, each thereof consisting of
a piezoelectric substrate $P_T$ having an upper- and a lower end surfaces running perpendicular to the direction of the thickness d thereof,
a piezoelectric substrate $P_R$ having an upper- and a lower end surfaces running perpendicular to the direction of the thickness d thereof,
an input interdigital transducer $T_o$ formed on said upper end surface of said piezoelectric substrate $P_T$,
N input interdigital transducers $M_i$ (i=1, 2, . . . , N) formed on said upper end surface of said piezoelectric substrate $P_T$, each interdigital transducer $M_i$ consisting of two electrodes $M_{i-1}$ and $M_{i-2}$ and having two kinds of distances between one electrode finger of said electrode $M_{i-1}$ and two neighboring electrode fingers of said electrode $M_{i-2}$,
an output interdigital transducer $R_o$ opposed to said interdigital transducer $T_o$, said interdigital transducer $R_o$ being formed on said upper end surface of said piezoelectric substrate $P_R$ and placed such that the finger direction of said interdigital transducer $R_o$ runs parallel with that of said interdigital transducer $T_o$, said thickness d of said piezoelectric substrates $P_T$ and $P_R$ being smaller than an interdigital periodicity P of said interdigital transducers $T_o$, $M_i$ and $R_o$,
at least two output interdigital transducers $R_{i1}$ and $R_{i2}$ (i=1, 2, . . . , N) opposed to each interdigital transducer $M_i$, said interdigital transducers $R_{i1}$ and $R_{i2}$ being formed on said upper end surface of said piezoelectric substrate $P_R$ such that the finger direction of said interdigital transducers $R_{i1}$ and $R_{i2}$ is slanting to that of said interdigital transducer $M_i$ by an angle $\alpha$, respectively, an interdigital periodicity $P_N$ along the vertical direction to the finger direction of said interdigital transducers $R_{i1}$ and $R_{i2}$ being equal to the product of said interdigital periodicity P and cos $\alpha$,
N earth electrodes $G_i$ (i=1, 2, . . . , N) formed on said lower end surface of said piezoelectric substrate $P_T$ and corresponding with said interdigital transducers $M_i$, respectively, and
a phase shifter S including at least a coil $L_1$;
a nonpiezoelectric plate having an upper- and a lower end surfaces running perpendicular to the thickness direction thereof, the thickness of said nonpiezoelectric plate being larger than three times said interdigital periodicity P, said piezoelectric substrates $P_T$ and $P_R$ being mounted on said upper end surface of said nonpiezoelectric plate through said lower end surfaces of said piezoelectric substrates $P_T$ and $P_R$; and
a controlling system connected with said surface acoustic wave transducing units X and Y,
said interdigital transducer $T_o$ receiving an electric signal with a frequency approximately corresponding to said interdigital periodicity P, exciting a surface acoustic wave of the first mode and the higher order modes in said piezoelectric substrate $P_T$, and transmitting said surface acoustic wave having the wavelength approximately equal to said interdigital periodicity P to said piezoelectric substrate $P_R$ through said upper end surface of said nonpiezoelectric plate, the phase velocity of said surface acoustic wave of said first mode and said higher order modes being approximately equal to the phase velocity of the Rayleigh wave traveling on said nonpiezoelectric plate alone,
said interdigital transducer $R_o$ transducing said surface acoustic wave excited by said interdigital transducer $T_o$ to an electric signal with a phase $\theta_{base}$ and delivering said electric signal,
each interdigital transducer $M_i$ and each earth electrode $G_i$ receiving an electric signal $V_1$ with a frequency approximately corresponding to said interdigital periodicity P between said electrode $M_{i-1}$ and said earth electrode $G_i$, and another electric signal $V_2$ with a frequency equal to that of said electric signal $V_1$ between said electrode $M_{i-2}$ and said earth electrode $G_i$ via said phase shifter S, exciting an unidirectional surface acoustic wave of the first mode and the higher order modes in said piezoelectric substrate $P_T$, and transmitting said unidirectional surface acoustic wave having the wavelength approximately equal to said interdigital periodicity P to said piezoelectric substrate $P_R$ through said upper end surface of said nonpiezoelectric plate, the phase velocity of said surface acoustic wave of said first mode and said higher order modes being approximately equal to the phase velocity of the Rayleigh wave traveling on said nonpiezoelectric plate alone, the phase difference between said electric signals $V_1$ and $V_2$ being $2\pi y$, each of said interdigital transducers $R_{i1}$ and $R_{i2}$ transducing said unidirectional surface acoustic wave excited by each interdigital transducer $M_i$ and each earth electrode $G_i$ to electric signals $E_j$ (j=1, 2, ..., X) with phases $\theta_j$ (j=1, 2, ..., X), respectively, said phases $\theta_j$ corresponding to positions $F_j$ (j=1, 2, ..., X) on said upper end surface of said nonpiezoelectric plate, respectively, each electric signal $E_j$ having a frequency approximately corresponding to said interdigital periodicity P, the total phase $\Sigma\theta_j$ made by said phases $\theta_j$ being zero, the total electric signal $\Sigma E_j$ made by said electric signals $E_j$ being zero and not able to be detected at each of said interdigital transducers $R_{i1}$ and $R_{i2}$, said nonpiezoelectric plate being made of a material such that the phase velocity of the surface acoustic wave traveling on said nonpiezoelectric plate alone is higher than that traveling on said piezoelectric substrates $P_T$ and $P_R$ alone, said interdigital transducers $M_i$ and $R_{i1}$ forming N propagation lanes $D_{i1}$ (i=1, 2, ..., N) of the surface acoustic wave on said upper end surface of said nonpiezoelectric plate, each propagation lane $D_{i1}$ consisting of minute propagation lanes $Z_j$ (j=1, 2, ..., X) corresponding to said positions $F_j$, said interdigital transducers $M_i$ and $R_{i2}$ forming N propagation lanes $D_{i2}$ (i=1, 2, ..., N) of the surface acoustic wave on said upper end surface of said nonpiezoelectric plate, each propagation lane $D_{i2}$ consisting of minute propagation lanes $Z_j$ (j=1, 2, ..., X) corresponding to said positions $F_j$, one of said interdigital transducers $R_{i1}$ and $R_{i2}$ delivering an electric signal E with a phase $\theta$ only when touching a position $F_x$, out of said positions $F_j$, on a minute propagation lane $Z_x$ out of said minute propagation lanes $Z_j$, said position $F_x$ corresponding to an electric signal $E_x$ with a phase $\theta_x$, said total electric signal $\Sigma E_j$ minus said electric signal $E_x$ being equal to said electric signal E, said total phase $\Sigma\theta_j$ minus said phase $\theta_x$ being equal to said phase $\theta$, said controlling system sensing a touch with a finger or others on said position $F_x$ by an appearance of said electric signal E at said one of said interdigital transducers $R_{i1}$ and $R_{i2}$, and finding said position $F_x$ by detecting said one, delivering said electric signal E, of said interdigital transducers $R_{i1}$ and $R_{i2}$, and by evaluating a difference between said phases $\theta$ and $\theta_{base}$.

11. A surface acoustic wave position-sensing device as defined in claim 10 further comprising:

N pairs of switches $W_i$ (i=1, 2, ..., N) corresponding to said interdigital transducers $M_i$, each pair of switches $W_i$ consisting of two switches $W_{i1}$ and $W_{i2}$, and output terminals of said switches $W_{i1}$ and $W_{i2}$ being connected with input terminals of said electrodes $M_{i-1}$ and $M_{i-2}$, respectively, output terminals of said interdigital transducers $R_{i1}$ being connected with each other at an output point $Q_1$, output terminals of said interdigital transducers $R_{i2}$ being connected with each other at an output point $Q_2$, said controlling system turning on and off said switches $W_i$ with a fixed period in turn, sensing a touch on said position $F_x$ by an appearance of said electric signal E at one of said output points $Q_1$ and $Q_2$, and finding said position $F_x$ by detecting said one, delivering said electric signal E, of said output points $Q_1$ and $Q_2$, by choosing a closed one out of said switches $W_i$ when said electric signal E appears, and by evaluating said difference between said phases $\theta$ and $\theta_{base}$.

12. A surface acoustic wave position-sensing device as defined in claim 10, wherein x<½ in a shorter distance xP of said two kinds of distances between one electrode finger of said electrode $M_{i-1}$ and two neighboring electrode fingers of said electrode $M_{i-2}$, and x+y=±½ in said phase difference $2\pi y$ between said electric signals $V_1$ and $V_2$.

13. A surface acoustic wave position-sensing device as defined in claim 10, wherein the sum of an overlap length $L_P$ along the finger direction of said interdigital transducer $R_{i1}$ and that of said interdigital transducer $R_{i2}$ is approximately equal to the product of an overlap length L of said interdigital transducer $M_i$ and sec $\alpha$.

14. A surface acoustic wave position-sensing device as defined in claim 10, wherein two neighbors of said propagation lanes $D_{i1}$ and $D_{i2}$ are closed or partially overlapping each other.

15. A surface acoustic wave position-sensing device as defined in claim 10, wherein said propagation lanes $D_{i1}$ and $D_{i2}$ of said surface acoustic wave transducing unit X and that of said surface acoustic wave transducing unit Y are vertical to each other.

16. A surface acoustic wave position-sensing device as defined in claim 10 further comprising:

an amplifier $A_x$, an input terminal of said interdigital transducer $R_o$ of said surface acoustic wave transducing unit X being connected with each input terminal of said interdigital transducer $T_o$ of said surface acoustic wave transducing units X and Y via said amplifier $A_x$, said interdigital transducers $T_o$ and $R_o$ in said surface acoustic wave transducing unit X, a propagation lane of a surface acoustic wave between said interdigital transducers $T_o$ and $R_o$ in said surface acoustic wave transducing unit X, and said amplifier $A_x$ forming an oscillator.

17. A surface acoustic wave position-sensing device as defined in claim 10, wherein each of said piezoelectric substrates $P_T$ and $P_R$ is made of a piezoelectric ceramic, the polarization axis thereof being parallel to the thickness direction thereof.

18. A surface acoustic wave position-sensing device as defined in claim 10, wherein each of said piezoelectric substrates $P_T$ and $P_R$ is made of a piezoelectric polymer such as PVDF and so on.

19. A surface acoustic wave position-sensing device as defined in claim 10 further comprising a supporting board cemented to said lower end surface of said nonpiezoelectric plate.

* * * * *